(12) United States Patent
MacDonnell

(10) Patent No.: US 12,331,533 B2
(45) Date of Patent: Jun. 17, 2025

(54) METHODS, APPARATUSES, AND DEVICES FOR FACILITATING INSTALLING ELECTRICAL BOXES IN A STRUCTURE

(71) Applicant: Adrian Shaun MacDonnell, Abbotsford (CA)

(72) Inventor: Adrian Shaun MacDonnell, Abbotsford (CA)

(*) Notice: Subject to any disclaimer, the term of this patent is extended or adjusted under 35 U.S.C. 154(b) by 346 days.

(21) Appl. No.: 18/101,585

(22) Filed: Jan. 26, 2023

(65) Prior Publication Data

US 2024/0254785 A1 Aug. 1, 2024

(51) Int. Cl.
*E04G 17/00* (2006.01)
*H02G 3/08* (2006.01)

(52) U.S. Cl.
CPC .............. *E04G 17/00* (2013.01); *H02G 3/08* (2013.01)

(58) Field of Classification Search
CPC ............. E04G 17/00; H02G 3/08; H02G 1/00
See application file for complete search history.

(56) References Cited

U.S. PATENT DOCUMENTS

| | | | | |
|---|---|---|---|---|
| 6,666,419 B1* | 12/2003 | Vrame | .................. | H02G 3/125 248/200.1 |
| 6,803,521 B2* | 10/2004 | Vrame | .................. | H02G 3/123 439/535 |
| 6,969,799 B2* | 11/2005 | Snyder | .................. | H02G 3/22 52/220.8 |
| 9,653,899 B2* | 5/2017 | Salian | .................. | F16B 5/0016 |
| 9,909,328 B2* | 3/2018 | Kurz | .................. | E04G 15/061 |
| 10,756,524 B2* | 8/2020 | Zhang | .................. | H02G 3/125 |
| 10,958,053 B2* | 3/2021 | Korcz | .................. | H02G 3/125 |
| 2007/0181330 A1* | 8/2007 | Dinh | .................. | H02G 3/125 174/58 |
| 2010/0006723 A1* | 1/2010 | Yan | .................. | H02G 3/125 248/201 |
| 2010/0270446 A1* | 10/2010 | Phillips | .................. | H05K 5/0204 248/201 |
| 2017/0009470 A1* | 1/2017 | Kurz | .................. | F16L 5/02 |
| 2020/0378553 A1* | 12/2020 | Oh | .................. | H02G 3/08 |

* cited by examiner

*Primary Examiner* — Gisele D Ford
(74) *Attorney, Agent, or Firm* — Dhiraj Jindal; PATENT YOGI LLC

(57) ABSTRACT

An apparatus for facilitating installing electrical boxes in a structure. The apparatus comprises a stand and an extendable member. The stand is securable in a location on a surface of a construction form used for constructing the structure. A first end is shaped to define an opening leading into an interior space of the stand and a second end of the stand is attachable to the surface for securing the stand to the surface. The extendable member is movably disposed of in the interior space and comprises a platform comprised in a first end of the extendable member. The extendable member is retractably extendable from the opening for retractably extending the platform for adjusting a depth of the extendable member. Further, the securing and the adjusting locates the platform in a platform location in the structure and maintains the platform location during the pouring and curing of the construction material.

19 Claims, 28 Drawing Sheets

METHODS, APPARATUSES, AND DEVICES FOR FACILITATING INSTALLING ELECTRICAL BOXES IN A STRUCTURE

FIELD OF THE INVENTION

Generally, the present disclosure relates to the field of electrical connectors. More specifically, the present disclosure relates to methods, apparatuses, and devices for facilitating installing electrical boxes in a structure.

BACKGROUND OF THE INVENTION

Existing techniques for installing electrical boxes are deficient with regard to several aspects. For instance, current electrical boxes require rebars for installing electrical boxes in a concrete structure such as a concrete wall. Furthermore, current electrical boxes may only be installed in certain locations of the concrete wall as they require rebar to be installed. As a result, different electrical boxes are needed that are installable in the concrete structure without the rebar. Moreover, current electrical boxes may only be installed on a side of the concrete wall that has a form installed on that side for constructing the concrete wall. As a result, different electrical boxes are needed that are installable on a side of the concrete wall that is opposite to a form installed for constructing the concrete wall.

Therefore, there is a need for improved methods, apparatuses, and devices for facilitating installing electrical boxes in a structure that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating installing electrical boxes in a structure, in accordance with some embodiments. Further, the structure may be constructed by pouring construction material against surfaces of construction forms used for constructing the structure. Further, the apparatus may include a stand and an extendable member. Further, the stand may be configured to be secured in at least one location on at least one surface of at least one construction form used for constructing the structure. Further, the stand extends between a first end and a second end. Further, the stand defines an interior space. Further, the first end of the stand may be shaped to define an opening leading into the interior space. Further, the second end of the stand may be configured to be attached to the at least one surface in the at least one location for securing the stand to the at least one surface. Further, the extendable member may be movably disposed in the interior space. Further, the extendable member extends between a first end and a second end. Further, the extendable member may include a platform comprised in the first end of the extendable member. Further, the extendable member may be retractably extendable from the opening for retractably extending the platform from a first position to at least one second position in relation to the opening for adjusting a depth of the extendable member. Further, the securing of the stand in the at least one location on the at least one surface and the adjusting of the depth of the extendable member locates the platform in at least one platform location in the structure and maintains the at least one platform location of the platform during the pouring of the construction material against the at least one surface of the at least one construction form and curing of the construction material.

Further disclosed herein is an apparatus for facilitating installing electrical boxes in a structure, in accordance with some embodiments. Further, the structure may be constructed by pouring construction material against surfaces of construction forms used for constructing the structure. Further, the apparatus may include a stand and an extendable member. Further, the stand may be configured to be secured in at least one location on at least one surface of at least one construction form used for constructing the structure. Further, the stand extends between a first end and a second end. Further, the stand defines an interior space. Further, the first end of the stand may be shaped to define an opening leading into the interior space. Further, the second end of the stand may be configured to be attached to the at least one surface in the at least one location for securing the stand to the at least one surface. Further, the extendable member may be movably disposed in the interior space. Further, the extendable member extends between a first end and a second end. Further, the extendable member may include a platform comprised in the first end of the extendable member.

Further, the platform may include a base wall and at least one side wall. Further, a first end of the at least one side wall may be peripherally attached to the base wall and extends vertically from the base wall forming an electrical box having a box interior space. Further, a second end of the at least one side wall may be shaped to define a box opening leading into the box interior space. Further, the extendable member may be retractably extendable from the opening for retractably extending the platform from a first position to at least one second position in relation to the opening for adjusting a depth of the extendable member. Further, the securing of the stand in the at least one location on the at least one surface and the adjusting of the depth of the extendable member locates the platform in at least one platform location in the structure and maintains the at least one platform location of the platform during the pouring of the construction material against the at least one surface of the at least one construction form and curing of the construction material.

Further disclosed herein is an apparatus for facilitating installing electrical boxes in a structure, in accordance with some embodiments. Further, the structure may be constructed by pouring construction material against surfaces of construction forms used for constructing the structure. Further, the apparatus may include a stand and an extendable member. Further, the stand may be configured to be secured in at least one location on at least one surface of at least one construction form used for constructing the structure. Further, the stand extends between a first end and a second end. Further, the stand defines an interior space. Further, the first end of the stand may be shaped to define an opening leading into the interior space. Further, the stand may include a plurality of stand leg portions extending between a first leg portion end and a second leg portion end. Further, the plurality of stand leg portions may be spaced apart and interconnected using a plurality of interconnecting stand portions of the stand. Further, the plurality of stand leg portions and the plurality of interconnecting portions defines the interior space. Further, the interior space extends from the first leg portion end of the plurality of stand leg portions to the second leg portion end of the plurality of stand leg portions. Further, the first leg portion end of the plurality of stand leg portions defines the opening. Further, the second end of the stand may be configured to be attached to the at least one surface in the at least one location for securing the stand to the at least one surface. Further, the extendable member may be movably disposed in the interior space. Further, the extendable member extends between a first end and a second end. Further, the extendable member may include a platform comprised in the first end of the extendable member. Further, the extendable member may include a plurality of leg portions extending between a first leg portion end and a second leg portion end. Further, the platform may be attached to the first leg portion end of the plurality of leg portions. Further, the extendable member may be retractably extendable from the opening for retractably extending the platform from a first position to at least one second position in relation to the opening for adjusting a depth of the extendable member. Further, at least one of the plurality of stand leg portions may include a plurality of first protrusions disposed on an inner stand leg surface of at least one of the plurality of stand leg portions. Further, the plurality of first protrusions consecutively extends from the first leg portion end and the second leg portion end of at least one of the plurality of stand leg portions defining a plurality of grooves. Further, each of the plurality of grooves may be disposed between each of two first protrusions of the plurality of first protrusions. Further, at least one of the plurality of leg portions may include a second protrusion disposed on an outer leg surface proximal to the second leg portion end of at least one of the plurality of leg portions. Further, the second protrusion disengably engages with at least one of the plurality of grooves based on the disposing of the extendable member in the interior space. Further, the plurality of grooves may include a first groove corresponding to the first position and at least one second groove corresponding to the at least one second position. Further, the retractably extending of the extendable member from the first position to the at least one second position in relation to the opening may include disengaging the second protrusion from the first groove and engaging the second protrusion to the at least one second groove. Further, the disengaging of the second protrusion from the first groove requires at least one external action on the extendable member in relation to the stand. Further, the engaging of the second protrusion to the at least one second groove fixes the extendable member to the stand in the at least one second position. Further, the securing of the stand in the at least one location on the at least one surface and the adjusting of the depth of the extendable member locates the platform in at least one platform location in the structure and maintains the at least one platform location of the platform during the pouring of the construction material against the at least one surface of the at least one construction form and curing of the construction material.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
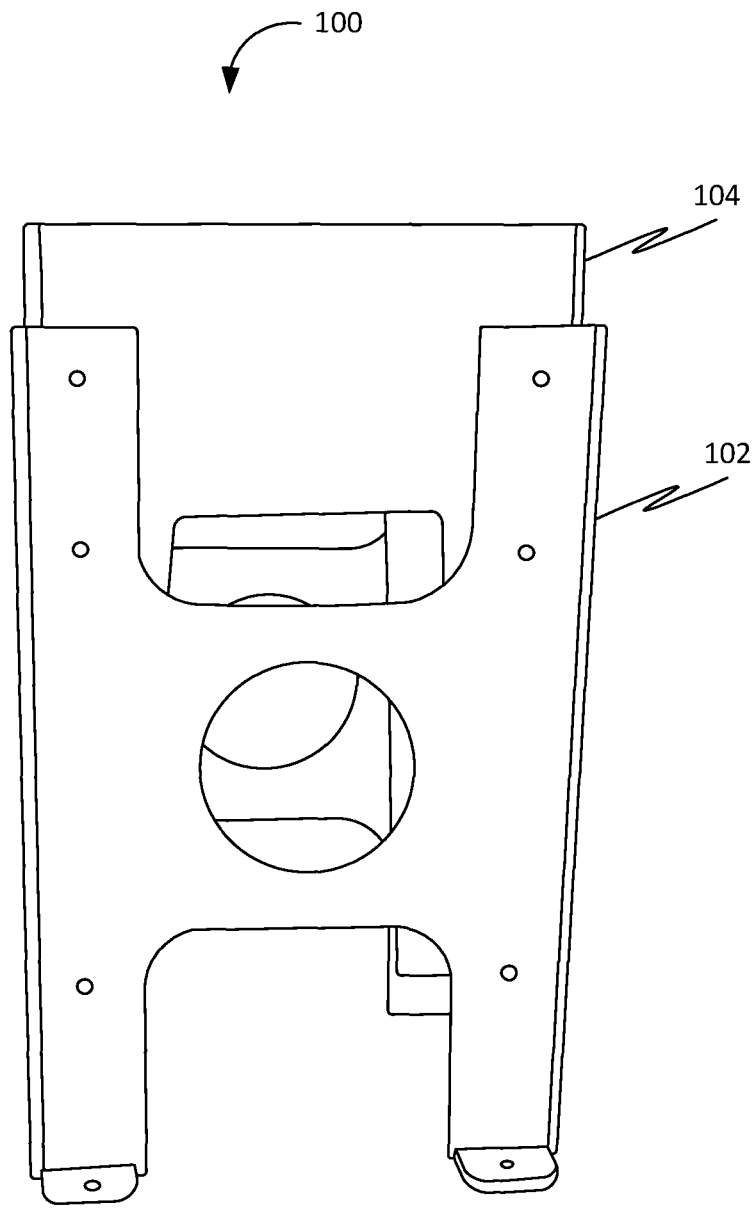
FIG. 1 is a front view of an apparatus 100 for facilitating installing electrical boxes in a structure, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive.

Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, apparatuses, and devices for facilitating installing electrical boxes in a structure, embodiments of the present disclosure are not limited to use only in this context.

OVERVIEW

The present disclosure describes methods, apparatuses, and devices for facilitating installing electrical boxes in a structure.

Further, the present disclosure describes an electrical box apparatus that can be mounted to a surface of a construction form used for constructing a structure. Further, an electrical box of the electrical box apparatus projects outward from the surface with an adjustable depth. The electrical box apparatus is designed to be used in concrete formwork, where the electrical box needs to be on the side of a wall (concrete wall) that is opposite to a form that was installed first for constructing the wall. Further, the electrical box apparatus can be used in several other situational scenarios to install the electrical box in a structure that would be incredibly helpful and save time. Further, the electrical box apparatus may be primarily used for installing the electrical box in concrete walls and columns, during the construction of the concrete walls and columns.

Further, the electrical box apparatus is quicker to install and set the electrical box to a perfect depth and the electrical box apparatus is sturdily mounted to prevent moving and shaking of the electrical box apparatus while workers work on and around the electrical box apparatus and later pour concrete on it. Further, the electrical box apparatus won't move or get damaged because it's (going to be) strong and mounted to the back form. It only takes 4 screws, but can be mounted with just 2 screws in the top legs. Further, a set screw through the leg of the stand to the leg of the electrical box is used to permanently set the depth of the electrical box.

Further, the present disclosure describes an electrical box apparatus comprising an electrical box. Further, the electrical box may be of multiple shapes such as a rectangular shape, a hexagonal shape, an octagonal shape, etc. Further, the electrical box apparatus may include a stand having legs in a variety of configurations for supporting the electrical box of multiple shapes.

Further, the present disclosure describes an electrical box apparatus comprising a platform of a shape (such as square, rectangular, circular, etc) and a stand having legs attached to the platform. Further, the platform would allow a tradesman (user) to screw an electrical box of any size or type to the platform. Further, the platform along with the electrical box may be set to any depth as per the tradesmen's requirement. The depth for the platform can be chosen from a range of depths provided by the electrical box apparatus.

Further, the present disclosure describes an electrical box apparatus comprising an electrical box. Further, the electrical box is designed to have a size that would allow installing of the electrical box apparatus in a wall. Further, the size of the electrical box also makes the electrical box compatible with wall switches and typical wall electrical devices/finishes.

Further, the present disclosure describes an electrical box apparatus comprising a recessed/flush mounted box that has mounting holes for weatherproof covers.

Further, the present disclosure describes an electrical box apparatus comprising an electrical box and a lid. Further, the lid sits flush with the face edges of the electrical box. Further, the lid attaches to metal device mounts of the electrical box. Further, the metal device mounts include plate holes. Further, the lid is provided with the electrical box only for temporary use (to block concrete from entering the electrical box). The lid is to be removed and disposed of after the forms are stripped. Further, the lid includes two small prongs that project from the lid. Further, the lid may be lined up with the electrical box and "snapped" into place. Further, the lid fits inside the sidewalls of the electrical box and is tight against the metal device mounts.

Further, the metal device mounts include a bonding screw for the electrical bond wire, dual purpose holes for attaching the lid and to leave space so that a final cover plate screw doesn't bottom out on the metal device mount, and mounting holes for any standard 120V North American electrical device (receptacles, switches, dimmers, thermostats, etc.). Further, the mounting holes (two) are tapped with 6/32 threads. Further, the metal device mounts include mounting holes for weatherproof covers for standard 120V North American devices. Further, the mounting holes (four) are tapped with 6/32 threading.

Further, the electrical box apparatus may include a stand (stand portion). Further, the stand comprising legs may include a foot on either end of the legs. Further, the legs are interconnected using center supports. Further, the center supports are not centered but rather offset from the center towards one of the ends making one passageway in the stand at one of the ends larger than the other passageway in the stand at the other end. The stand with two passageways one larger than the other allows the stand to straddle rebars disposed along the form, no matter what depth the rebars sit off the back form.

Further, the stand includes spaced corrugated ridges (⅛") on the inside of the stand where the legs of the electrical box contact the stand. The ends of the legs have positive ridges that will fit in the negative ridges of the stand. Further, pushing the electrical box into the stand, makes the electrical box "click" inward ⅛" at a time. Further, pushing in and pushing out of the electrical box from the stand has the same resistance/clicking. Further, the clicking of the electrical box while pushing in and pulling out from the stand assists in setting the depth more easily and consistently for all four legs of the electrical box.

Further, the present disclosure describes an electrical box apparatus comprising an electrical box and a stand. Further, the stand of the electrical box apparatus is to be fastened to the vertical (wall or column) concrete form and the electrical box is extended to the desired depth of closing form. Further, the electrical box apparatus may include a cover (lid). Further, the cover is configured to fit inside flush and held by the large hole in the metal device mounts of the electrical box. Further, the electrical box apparatus may be comprised of Polyvinyl chloride (PVC). The metal device mounts allow for standard 120V receptacles and weatherproof mounting, with sufficient space for standard cover plate (lid) screws to pass. Further, the electrical box is comprised of flat sides and allows an installer (user) to determine a custom size (up to allowable by local code for box size) and location (top, bottom, sides, back) of a hole for an entry of a conduit.

Further, the present disclosure describes an electrical box that can be mounted to a rear surface and projected outward from the rear surface with an adjustable depth. Further, the electrical box is used in the concrete formwork.

Further, the present disclosure describes an electrical box apparatus that may provide efficient and reliable ways to install the electrical box in concrete walls when the electrical box faces the open side of the form. Further, the electrical box apparatus may be used to quickly install the electrical box independent of the rebar.

FIG. 1 is a front view of an apparatus 100 for facilitating installing electrical boxes in a structure, in accordance with some embodiments. Further, the structure may be constructed by pouring construction material against surfaces of construction forms used for constructing the structure. Further, the apparatus 100 may include a stand 102 and an extendable member 104. Further, the structure may include a wall, a floor, a ceiling, etc. Further, the construction material may include concrete. Further, the apparatus 100 may be comprised of at least one polymer material. Further, the at least one polymer material may inclyde Polyvinyl chloride (PVC).

Further, the stand 102 may be configured to be secured in at least one location on at least one surface 1102 of at least one construction form 1104 used for constructing the structure. Further, the stand 102 extends between a first end 106 and a second end 108. Further, the stand 102 defines an interior space 110. Further, the first end 106 of the stand 102 may be shaped to define an opening 112 leading into the interior space 110. Further, the second end 108 of the stand 102 may be configured to be attached to the at least one surface 1102 in the at least one location for securing the stand 102 to the at least one surface 1102. Further, in an embodiment, the stand 102 may include at least one foot extending from the second end 108. Further, the at least one foot may include at least one hole. Further, the at least one hole receives at least one attaching element (such as a screw, a nail, a bolt, etc.) for attaching the at least one foot to the at least one surface 1102 for the securing of the stand 102 to the at least one surface 1102. Further, the at least one foot extends laterally from the second end 108 of the stand 102 in relation to the stand 102. Further, in an embodiment, the second end 108 of the stand 102 may be shaped in a wedge. Further, the wedge may be driven in the at least one construction form 1104 for attaching the second end 108 of the stand 102 to the at least one surface 1102.

Further, the extendable member 104 may be movably disposed in the interior space 110. Further, the extendable member 104 extends between a first end 114 and a second end 116. Further, the extendable member 104 may include a platform 118 comprised in the first end 114 of the extendable member 104. Further, the extendable member 104 may be retractably extendable from the opening 112 for retractably extending the platform from a first position to at least one second position in relation to the opening 112 for adjusting a depth of the extendable member 104. Further, the securing of the stand 102 in the at least one location on the at least one surface 1102 and the adjusting of the depth of the extendable member 104 locates the platform in at least one platform location in the structure and maintains the at least one platform location of the platform during the pouring of the construction material against the at least one surface 1102 of the at least one construction form 1104 and curing of the construction material. Further, the depth corresponds to a length of the extendable member 104 extending from the first end 106 of the stand 102.

Figure 4:
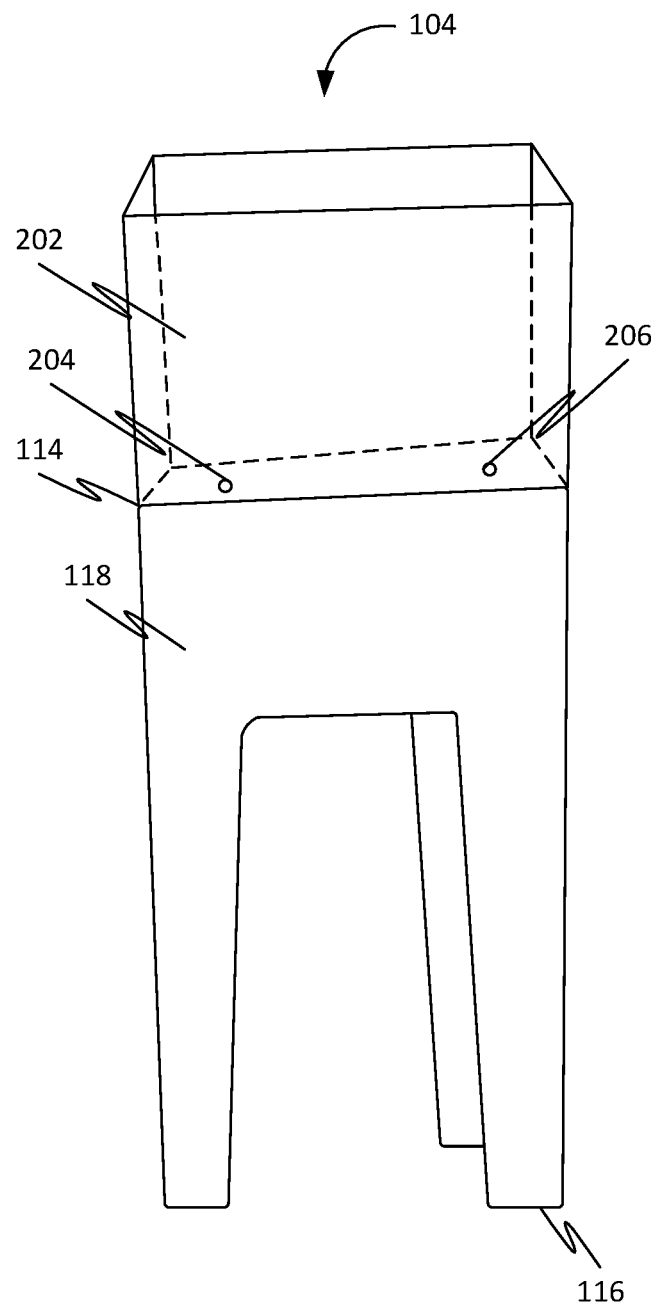
FIG. 4 is a front view of the extendable member 104 of the apparatus 100 with the at least one electrical box 202, in accordance with some embodiments.

In further embodiments, the apparatus 100 may include at least one electrical box 202, as shown in FIG. 4. Further, the at least one electrical box 202 may be configured to be attached to the platform using at least one attaching element 204-206, as shown in FIG. 4. Further, locating the platform in the at least one platform location locates the at least one electrical box 202 in at least one box location in the structure. Further, the securing of the stand 102 in the at least one location maintains the at least one box location of the at least one box during the pouring of the construction material against the at least one surface 1102 of the at least one construction form 1104 and the curing of the construction material.

Figure 5:
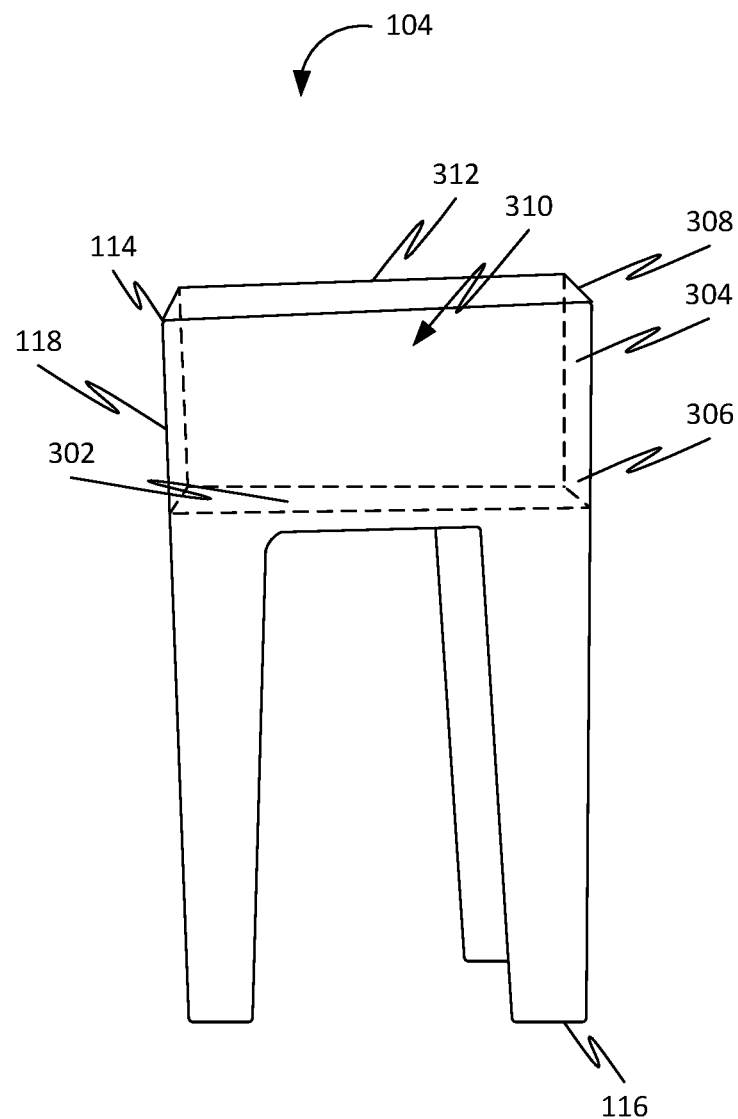
FIG. 5 is a front view of the extendable member 104 with the box interior space 310, in accordance with some embodiments.

Further, in some embodiments, the platform may include a base wall 302 and at least one side wall 304, as shown in FIG. 5. Further, a first end 306 of the at least one side wall 304 may be peripherally attached to the base wall 302 and extends vertically from the base wall 302 forming an electrical box having a box interior space 310, as shown in FIG. 5. Further, a second end 308, as shown in FIG. 5, of the at least one side wall 304 may be shaped to define a box opening 312 leading into the box interior space 310.

Figure 8:
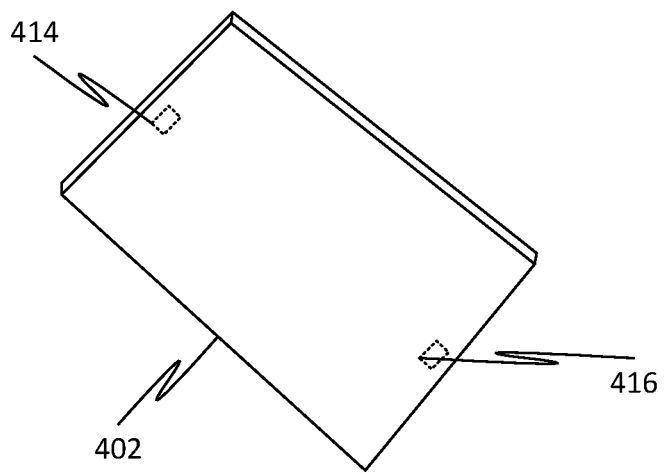
FIG. 8 is a top perspective view of a lid 402 of the apparatus 100, in accordance with some embodiments.

Further, in an embodiment, the platform may include a lid 402, as shown in FIG. 8. Further, the lid 402 may be configured to be detachably attached to the second end 308 of the at least one side wall 304 for openably closing the box opening 312. Further, the lid 402 attached to the second end 308 of the at least one side wall 304 closes the box opening 312 to prevent the construction material from entering the box interior space 310 during the pouring of the construction material and the curing of the construction material.

Figure 6:
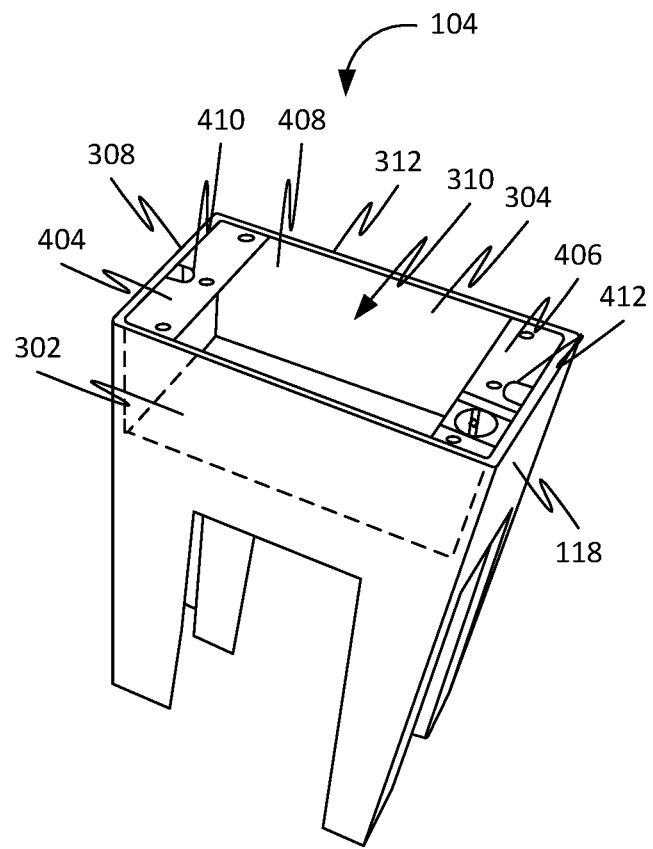
FIG. 6 is a top perspective view of the extendable member 104 of the apparatus 100, in accordance with some embodiments.

Further, in an embodiment, the platform may include at least one mount 404-406, as shown in FIG. 6. Further, the at least one mount 404-406 may be comprised of at least one metal. Further, the at least one metal may include steel, steel based alloy, aluminum, aluminum based alloy, etc. Further, the at least one mount 404-406 may be disposed in the box interior space 310 and attached to at least one inner wall surface 408 of the at least one side wall 304. Further, the at least one mount 404-406 may include at least one mounting hole (410 and 412). Further, the lid 402 may include at least one mounting element 414-416, as shown in FIG. 8. Further, the at least one mounting element 414-416 disengably engages with the at least one mounting hole (410 and 412) for detachably attaching the lid 402 to the second end 308 of the at least one side wall 304. Further, the at least one mounting element 414-416 may include at least one set of prongs.

Figure 10:
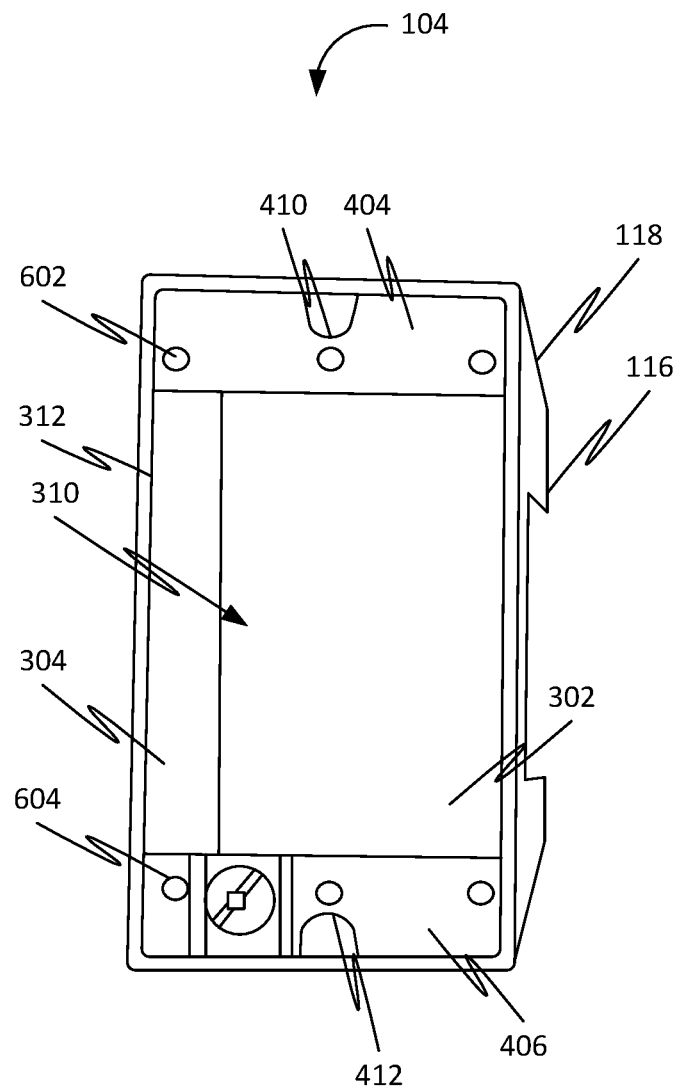
FIG. 10 is a top view of the extendable member 104 of the apparatus 100 with the at least one mount 404-406, in accordance with some embodiments.

Further, in an embodiment, the at least one mount 404-406 may include at least one additional mounting hole 602-604, as shown in FIG. 10, for mounting at least one device to the electrical box. Further, the at least one device may include an electrical device (receptacles, switches, dimmers, thermostats, etc.), a weatherproof cover, etc.

Figure 14:
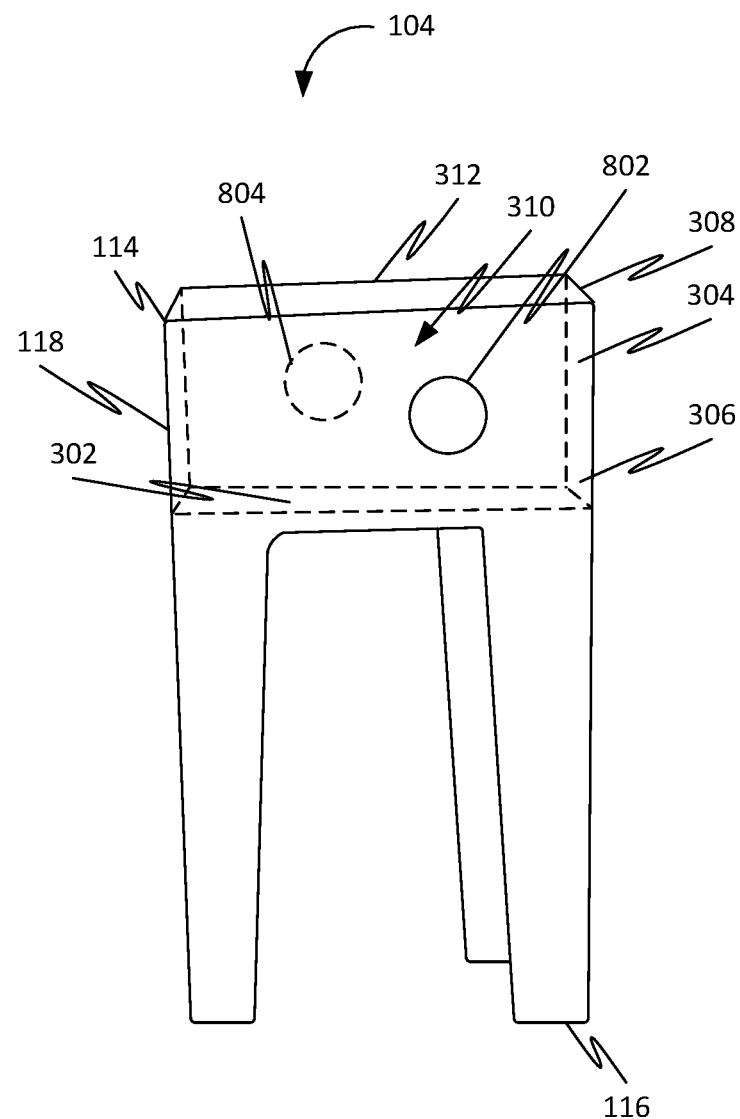
FIG. 14 is a front view of the extendable member 104 of the apparatus 100 with the at least one conduit opening 802-804, in accordance with some embodiments.

Further, in an embodiment, the at least one side wall 304 may include at least one conduit opening 802-804, as shown in FIG. 14. Further, the at least one conduit opening 802-804 allows connecting at least one electrical conduit to the electrical box. Further, the at least one electrical conduit may include at least one electrical pipe. Further, the at least one electrical pipe carries at least one electric wire.

Figure 2:
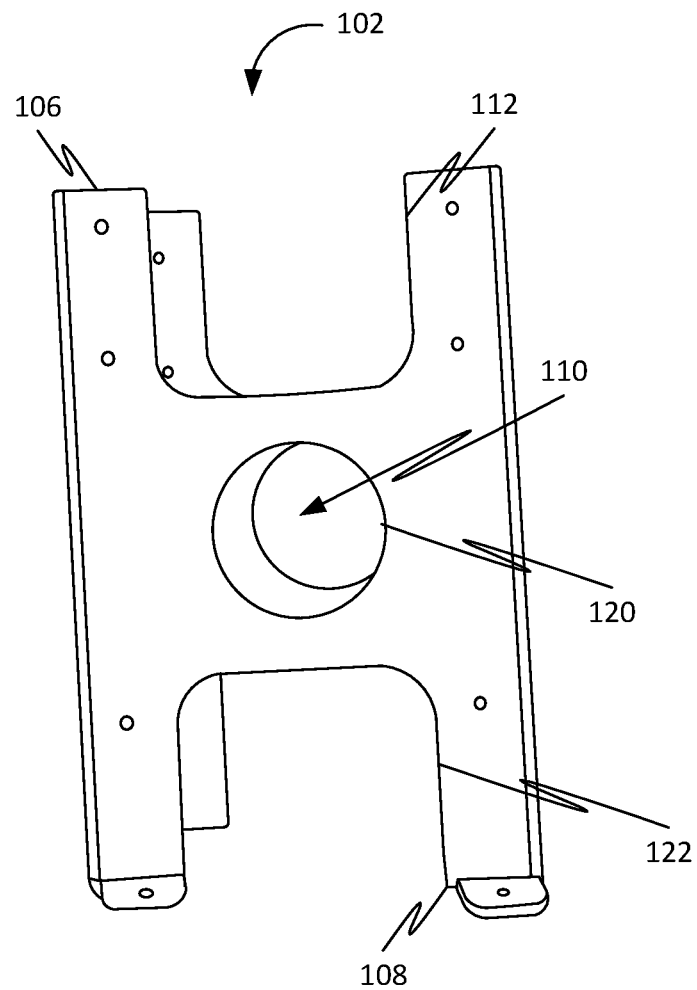
FIG. 2 is a front view of the stand 102 of the apparatus 100, in accordance with some embodiments.

Further, in some embodiments, the stand 102 may include at least one body opening 120-122, as shown in FIG. 2, leading into the interior space 110. Further, the at least one body opening 120-122 allows the construction material to enter into the interior space 110 during the pouring of the construction material and the curing of the construction material.

Further, in some embodiments, the extendable member 104 may be removably disposed in the interior space 110 of the stand 102.

Further, in some embodiments, the at least one second position corresponds to at least one amount of the depth of the platform. Further, the extendable member 104 may be configured to be resistively moved from the first position and fixed to the stand 102 in the at least one second position for the adjusting of the depth of the platform.

Further, in an embodiment, the extendable member 104 may be configured to be detachably attached to the stand 102 in the at least one second position using at least one attachment element for fixing the extendable member 104 to the stand 102 in the at least one second position. Further, the at least one attachment element may include a screw, a nail, a ridge, etc.

Further, in some embodiments, the stand 102 may include a plurality of stand leg portions 1402-1408 extending between a first leg portion end (1410,1412, and 1414) and a second leg portion end (1416, 1418, 1420, and 1422). Further, the first end 106 of the stand 102 may include the first leg portion end (1410,1412, and 1414) and the second end 108 of the stand 102 may include the second leg portion end (1416, 1418, 1420, and 1422). Further, the plurality of stand leg portions 1402-1408 may be spaced apart and interconnected using a plurality of interconnecting stand portions 1424-1430 of the stand 102. Further, the plurality of stand leg portions 1402-1408 and the plurality of interconnecting portions defines the interior space 110. Further, the interior space 110 extends from the first leg portion end (1410,1412, and 1414) of the plurality of stand leg portions 1402-1408 to the second leg portion end (1416, 1418, 1420, and 1422) of the plurality of stand leg portions 1402-1408. Further, the first leg portion end (1410,1412, and 1414) of the plurality of stand leg portions 1402-1408 defines the opening 112. Further, in an embodiment, the plurality of interconnecting stand portions 1424-1430 may be offset from a center of the plurality of stand leg portions 1402-1408 towards the first end 106 of the stand 106 defining a passageway in the stand 102. Further, the passageway allows the stand 102 to straddle at least one rebar associated with the structure during installing the apparatus 100.

Further, in an embodiment, the extendable member 104 may include a plurality of leg portions 1502-1504 extending between a first leg portion end (1506 and 1510) and a second leg portion end (1508 and 1512). Further, the first end 114 of the extendable member 104 may include the first leg portion end (1506 and 1510) and the second end 116 of the extendable member 104 may include the second leg portion end (1508 and 1512). Further, the platform may be attached to the first leg portion end (1506 and 1510) of the plurality of leg portions 1502-1504.

Further, in an embodiment, at least one of the plurality of stand leg portions 1402-1408 may include a plurality of first protrusions 1604-1610 disposed on an inner stand leg surface 1602 of at least one of the plurality of stand leg portions 1402-1408. Further, the plurality of first protrusions 1604-1610 may include negative ridges. Further, the plurality of first protrusions 1604-1610 consecutively extends from the first leg portion end (1410,1412, and 1414) and the second leg portion end (1416, 1418, 1420, and 1422) of at least one of the plurality of stand leg portions 1402-1408 defining a plurality of grooves 1612-1616. Further, each of the plurality of grooves 1612-1616 may be disposed between each of two first protrusions of the plurality of first protrusions 1604-1610. Further, at least one of the plurality of leg portions 1502-1504 may include a second protrusion 1702 disposed on an outer leg surface 1704 proximal to the second leg portion end (1508 and 1512) of at least one of the plurality of leg portions 1502-1504. Further, the second protrusion 1702 may include a positive ridge. Further, the second protrusion 1702 disengably engages with at least one of the plurality of grooves 1612-1616 based on the disposing of the extendable member 104 in the interior space 110. Further, the disengably engaging of the second protrusion 1702 with at least one of the plurality of grooves 1612-1616 may include fitting the positive ridge in at least one of the negative ridges. Further, the inner stand leg surface 1602 opposes the outer leg surface 1704 based on the disposing of the extendable member 104 in the interior space 110.

Further, in an embodiment, the plurality of grooves 1612-1616 may include a first groove 1612 corresponding to the first position and at least one second groove 1614-1616 corresponding to the at least one second position. Further, the retractably extending of the extendable member 104 from the first position to the at least one second position in relation to the opening 112 may include disengaging the second protrusion 1702 from the first groove 1612 and engaging the second protrusion 1702 to the at least one second groove 1614-1616.

Further, in an embodiment, the disengaging of the second protrusion 1702 from the first groove 1612 requires at least one external action on the extendable member 104 in relation to the stand 102. Further, the at least one external action may include pushing, pulling, etc. Further, the engaging of the second protrusion 1702 to the at least one second groove 1614-1616 fixes the extendable member 104 to the stand 102 in the at least one second position.

FIG. 2 is a front view of the stand 102 of the apparatus 100, in accordance with some embodiments.

Figure 3:
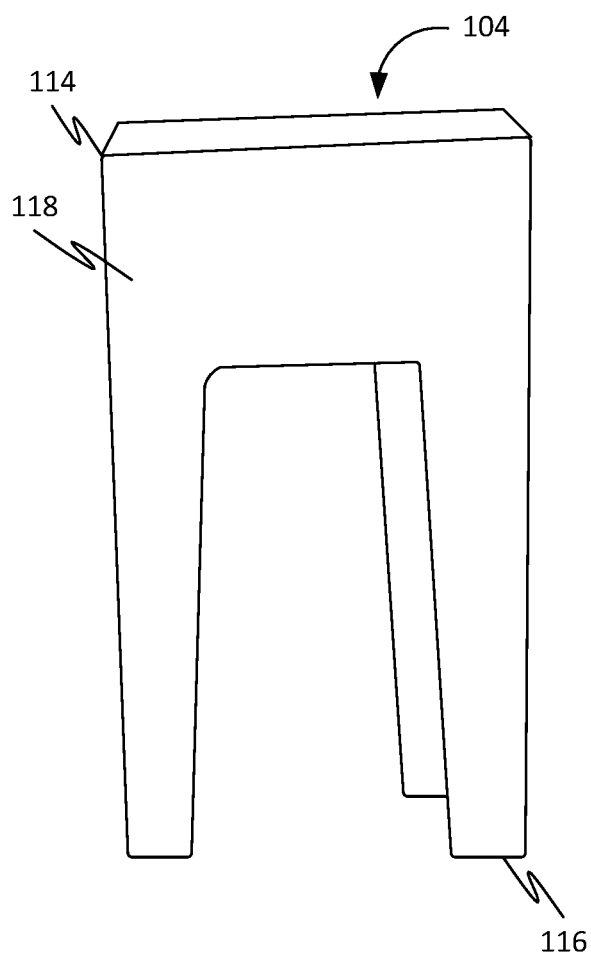
FIG. 3 is a front view of the extendable member 104 of the apparatus 100, in accordance with some embodiments.

FIG. 3 is a front view of the extendable member 104 of the apparatus 100, in accordance with some embodiments.

FIG. 4 is a front view of the extendable member 104 of the apparatus 100 with the at least one electrical box 202, in accordance with some embodiments.

FIG. 5 is a front view of the extendable member 104 with the box interior space 310, in accordance with some embodiments.

FIG. 6 is a top perspective view of the extendable member 104 of the apparatus 100, in accordance with some embodiments.

Figure 7:
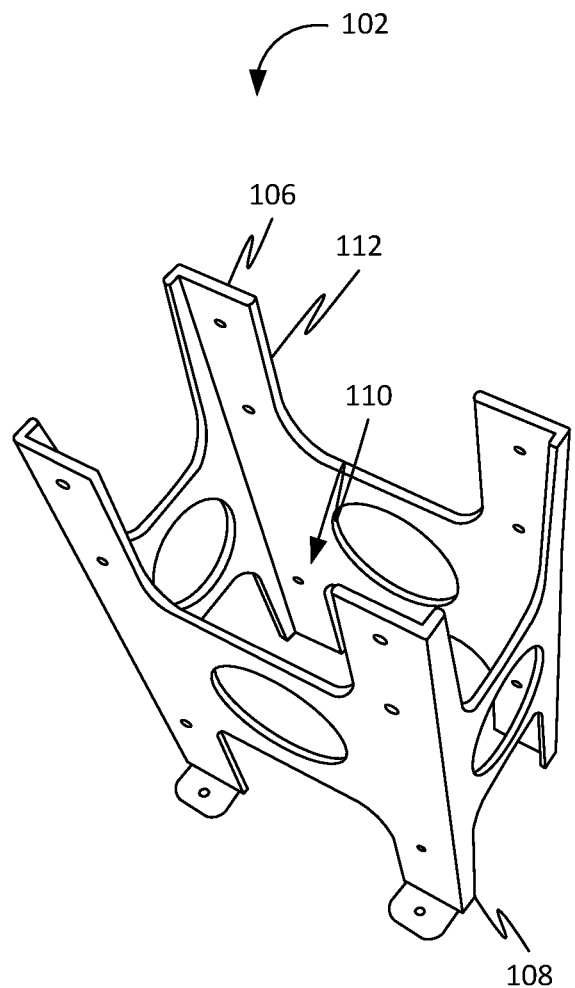
FIG. 7 is a top perspective view of the stand 102 of the apparatus 100, in accordance with some embodiments.

FIG. 7 is a top perspective view of the stand 102 of the apparatus 100, in accordance with some embodiments.

FIG. 8 is a top perspective view of a lid 402 of the apparatus 100, in accordance with some embodiments.

Figure 9:
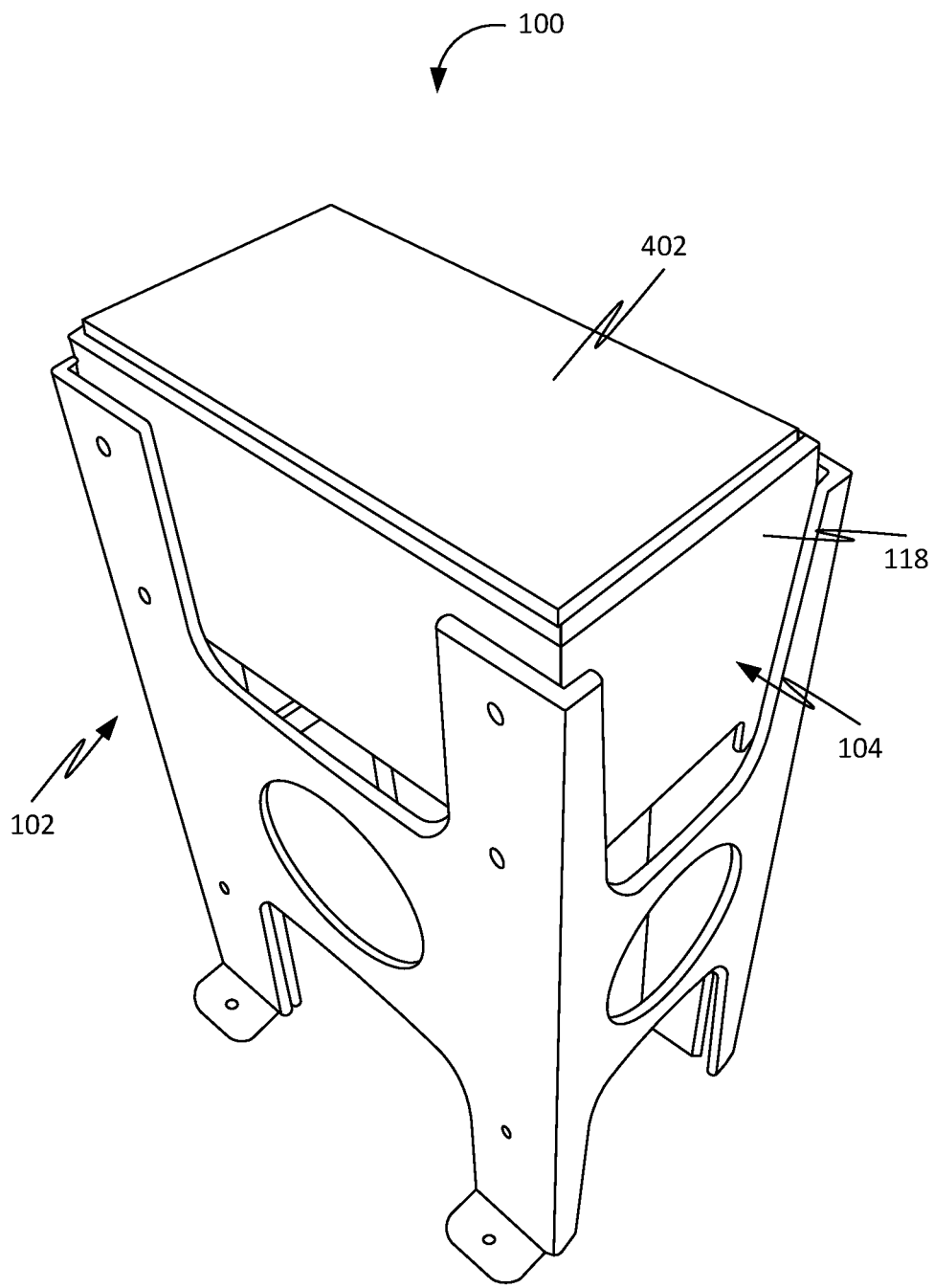
FIG. 9 is a top perspective view of the apparatus 100 with the lid 402, in accordance with some embodiments.

FIG. 9 is a top perspective view of the apparatus 100 with the lid 402, in accordance with some embodiments.

FIG. 10 is a top view of the extendable member 104 of the apparatus 100 with the at least one mount 404-406, in accordance with some embodiments.

Figure 11:
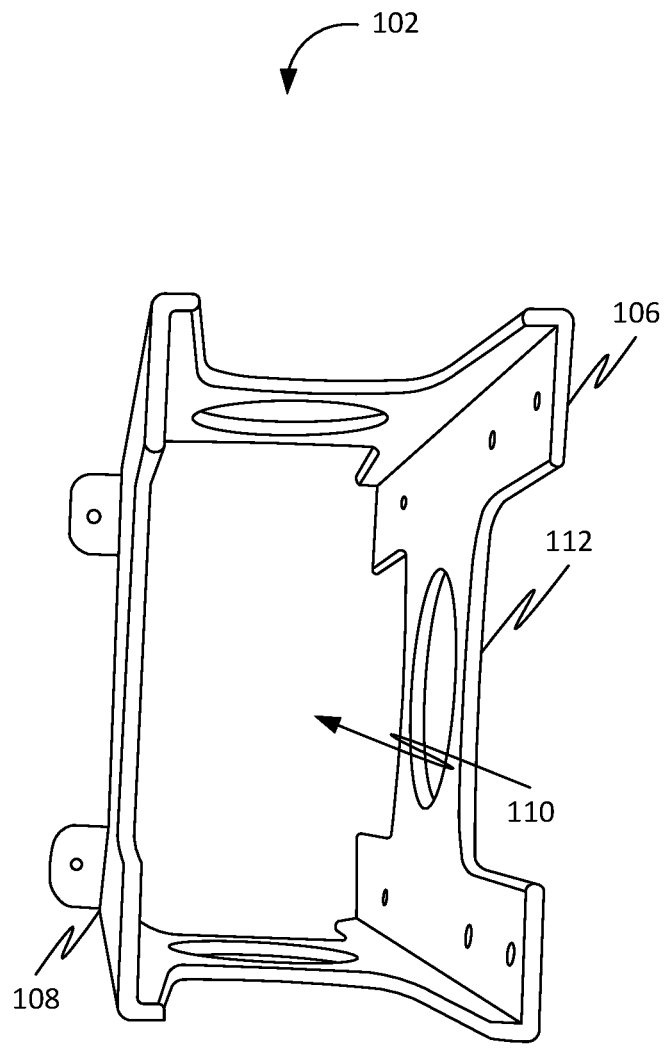
FIG. 11 is a top view of the stand 102 of the apparatus 100, in accordance with some embodiments.

FIG. 11 is a top view of the stand 102 of the apparatus 100, in accordance with some embodiments.

Figure 12:
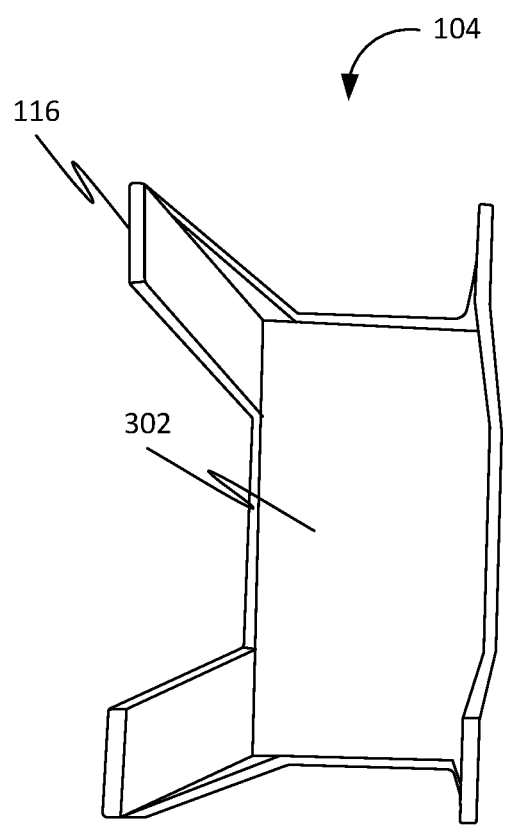
FIG. 12 is a bottom view of the extendable member 104 of the apparatus 100, in accordance with some embodiments.

FIG. 12 is a bottom view of the extendable member 104 of the apparatus 100, in accordance with some embodiments.

Figure 13:
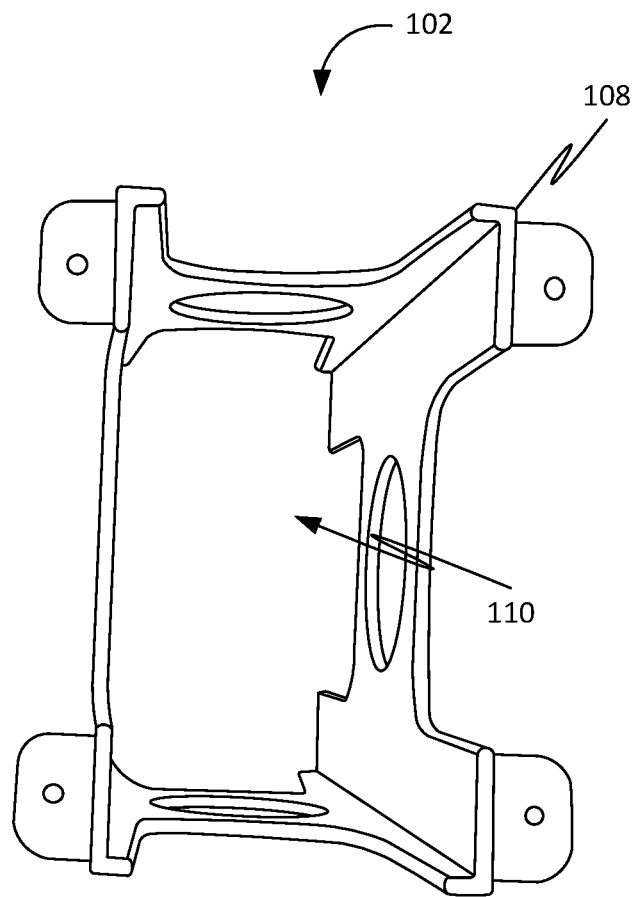
FIG. 13 is a bottom view of the stand 102 of the apparatus 100, in accordance with some embodiments.

FIG. 13 is a bottom view of the stand 102 of the apparatus 100, in accordance with some embodiments.

FIG. 14 is a front view of the extendable member 104 of the apparatus 100 with the at least one conduit opening 802-804, in accordance with some embodiments.

Figure 15:
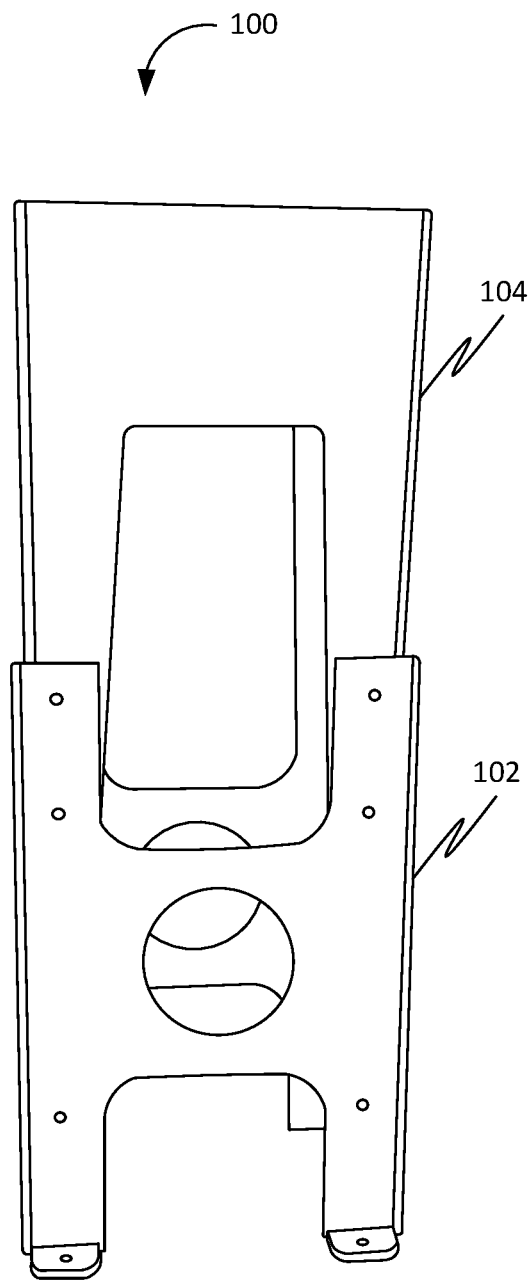
FIG. 15 is a front view of the apparatus 100 with the extendable member 104 disposed within the stand 102 and extended in the at least one second position, in accordance with some embodiments.

FIG. 15 is a front view of the apparatus 100 with the extendable member 104 disposed within the stand 102 and extended in the at least one second position, in accordance with some embodiments.

Figure 16:
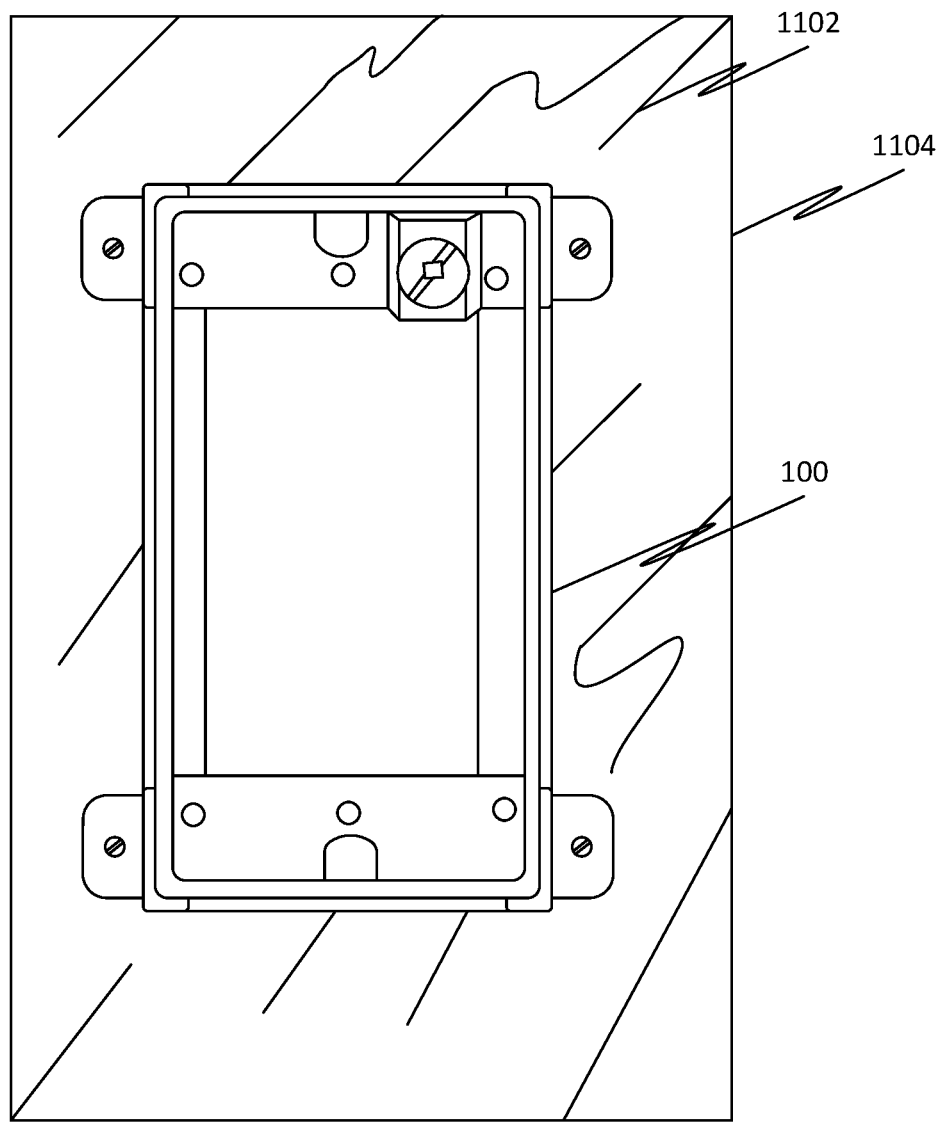
FIG. 16 is a top view of the apparatus 100 secured to the at least one surface 1102 of the at least one construction form 1104, in accordance with some embodiments.

FIG. 16 is a top view of the apparatus 100 secured to the at least one surface 1102 of the at least one construction form 1104, in accordance with some embodiments.

Figure 17:
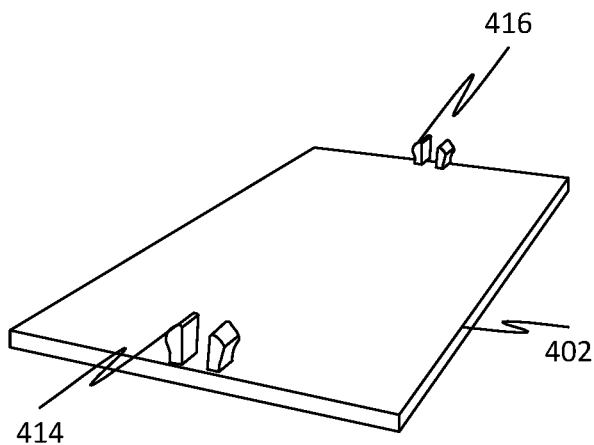
FIG. 17 is a bottom view of the lid 402, in accordance with some embodiments.

FIG. 17 is a bottom view of the lid 402, in accordance with some embodiments.

Figure 18:
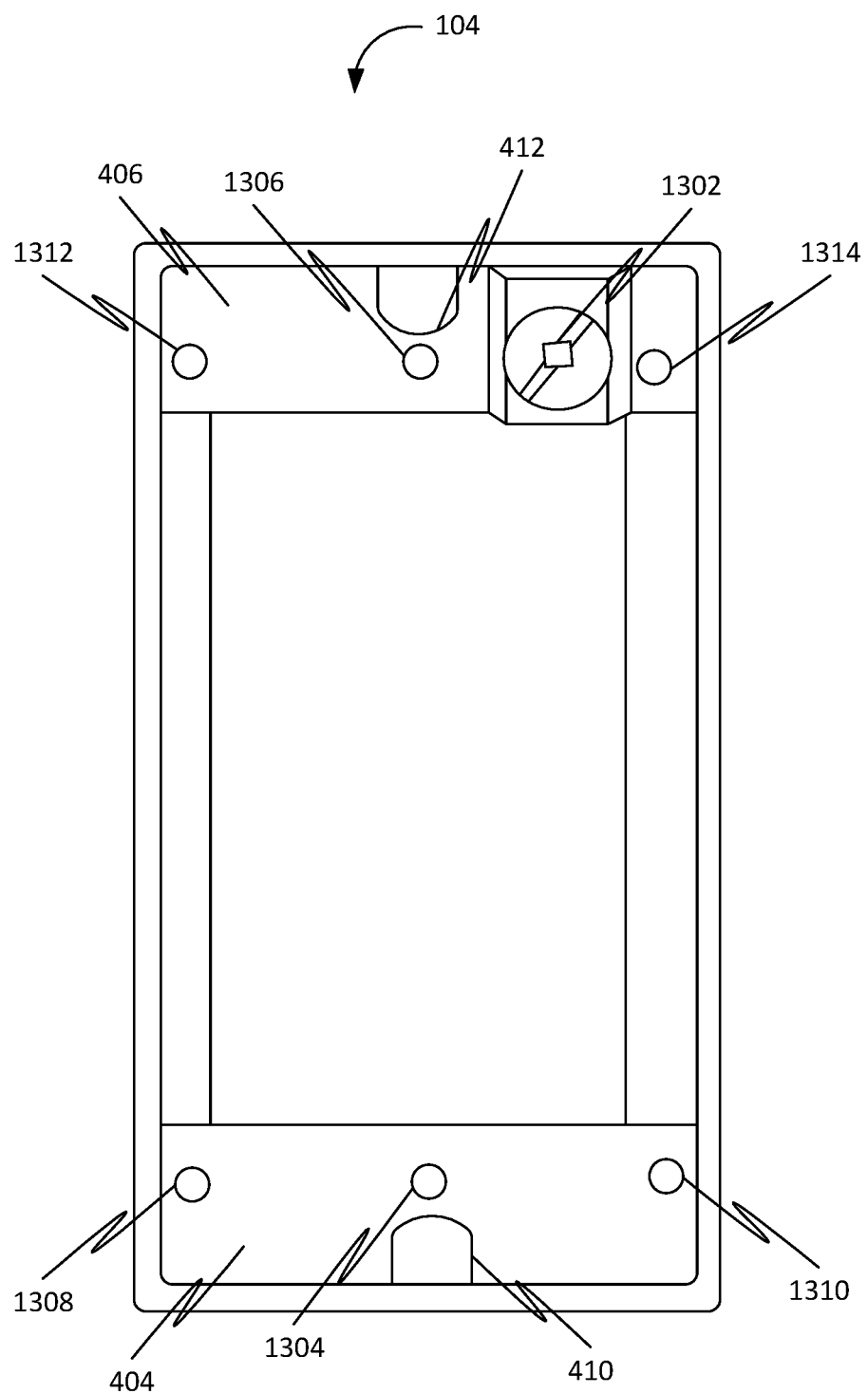
FIG. 18 is a top view of the extendable member 104 of the apparatus 100 with the at least one mount 404-406 comprising a bonding screw 1302, in accordance with some embodiments.

FIG. 18 is a top view of the extendable member 104 of the apparatus 100 with the at least one mount 404-406 comprising a bonding screw 1302, in accordance with some embodiments. Further, the the at least one mount 404-406 may include the bonding screw 1302 for an electrical bond wire, dual purpose holes 410-412 for attaching the lid 402, and to leave space so that a final cover plate screw doesn't bottom out on the metal device mount, and mounting holes 1304-1306 for any standard 120V North American electrical device (receptacles, switches, dimmers, thermostats, etc.). Further, the mounting holes 1304-1306 (two) are tapped with $6/32$ threads. Further, the at least one mount 404-406 may include mounting holes 1308-1314 for weatherproof covers for standard 120V North American devices. Further, the mounting holes 1308-1314 (four) are tapped with $6/32$ threading.

Figure 19:
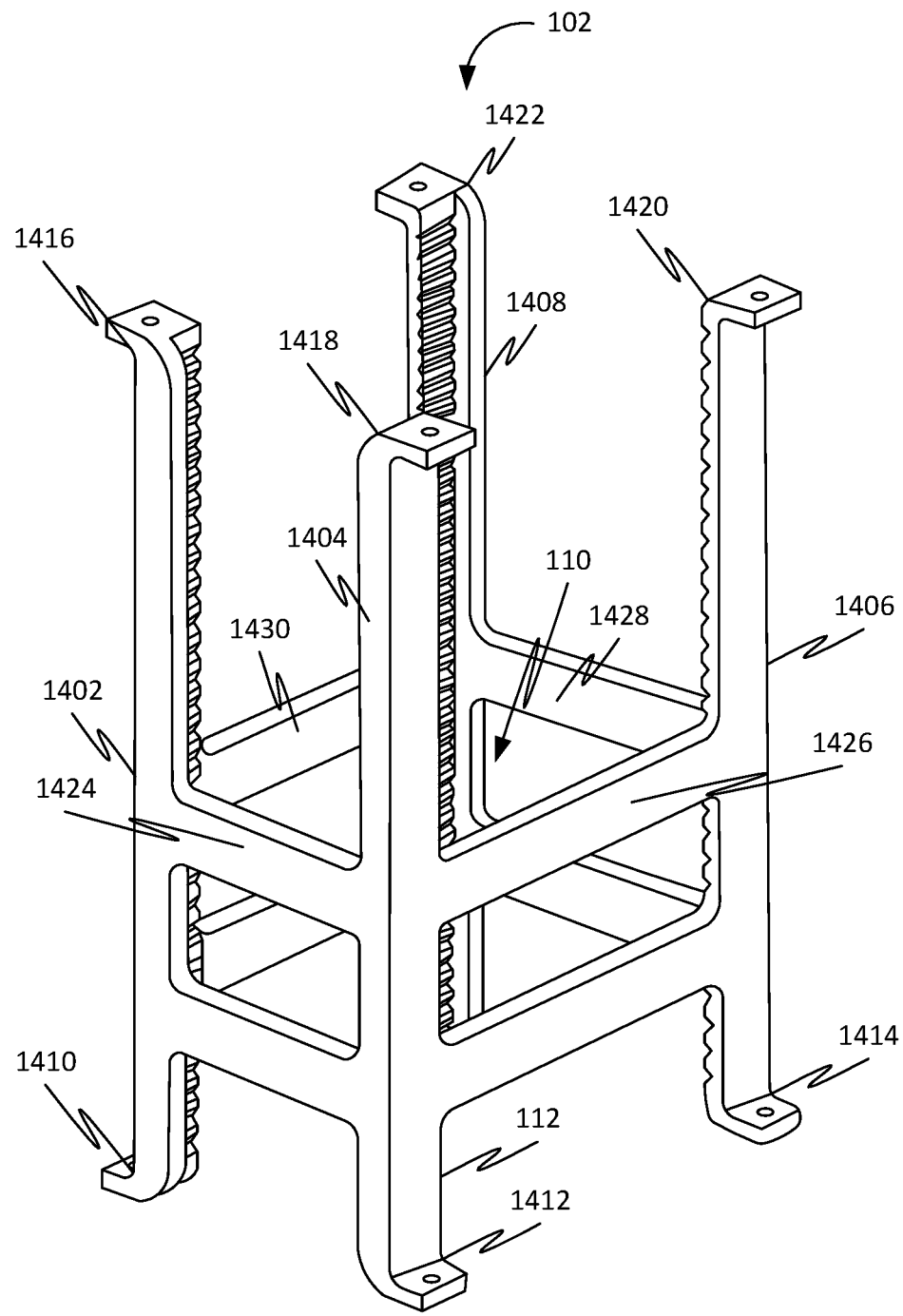
FIG. 19 is a front perspective view of the stand 102 comprising the plurality of stand leg portions 1402-1408 and the plurality of interconnecting stand portions 1424-1430, in accordance with some embodiments.

FIG. 19 is a front perspective view of the stand 102 comprising the plurality of stand leg portions 1402-1408 and the plurality of interconnecting stand portions 1424-1430, in accordance with some embodiments.

Figure 20:
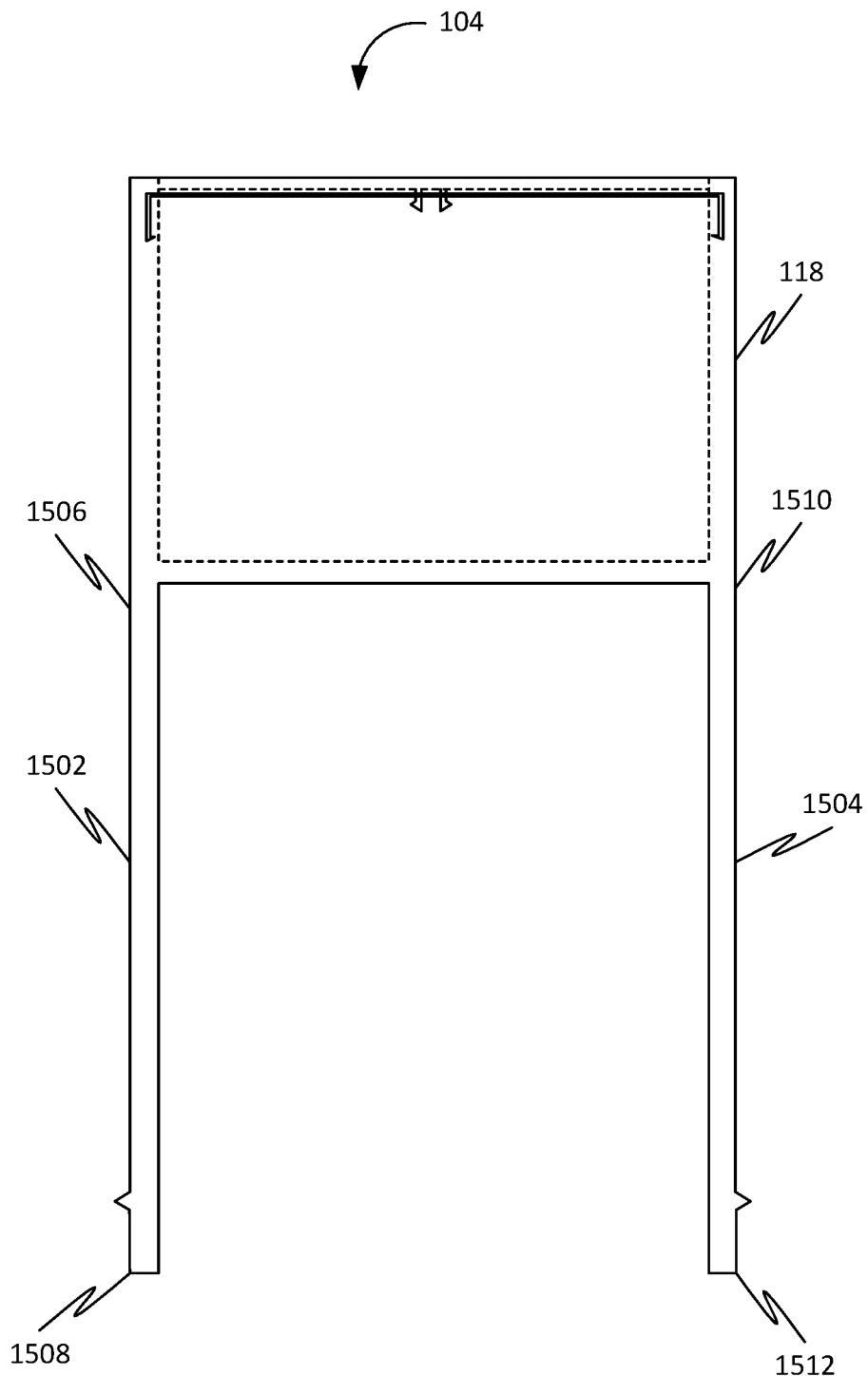
FIG. 20 is a side view of the extendable member 104 comprising the plurality of leg portions 1502-1504, in accordance with some embodiments.

FIG. 20 is a side view of the extendable member 104 comprising the plurality of leg portions 1502-1504, in accordance with some embodiments.

Figure 21:
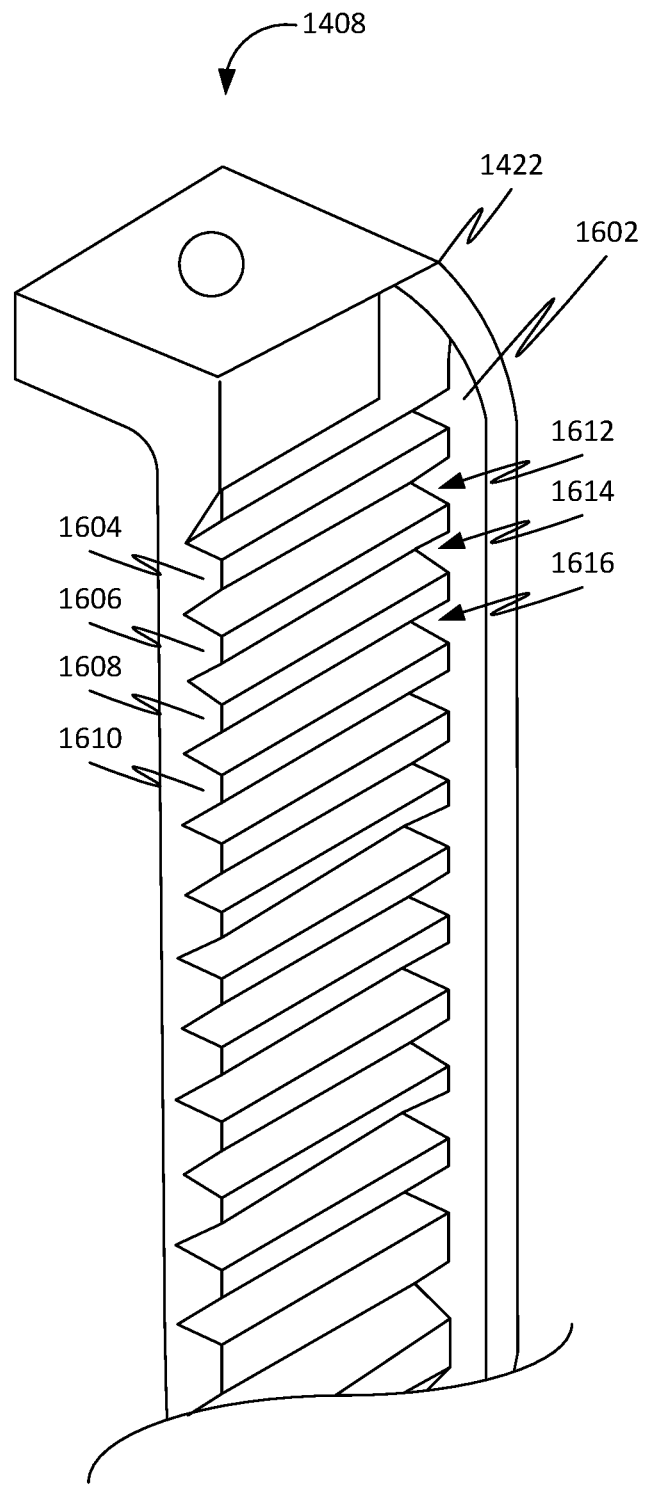
FIG. 21 is a partial perspective view of a stand leg portion 1408 of the plurality of stand leg portions 1402-1408, in accordance with some embodiments.

FIG. 21 is a partial perspective view of a stand leg portion 1408 of the plurality of stand leg portions 1402-1408, in accordance with some embodiments.

Figure 22:
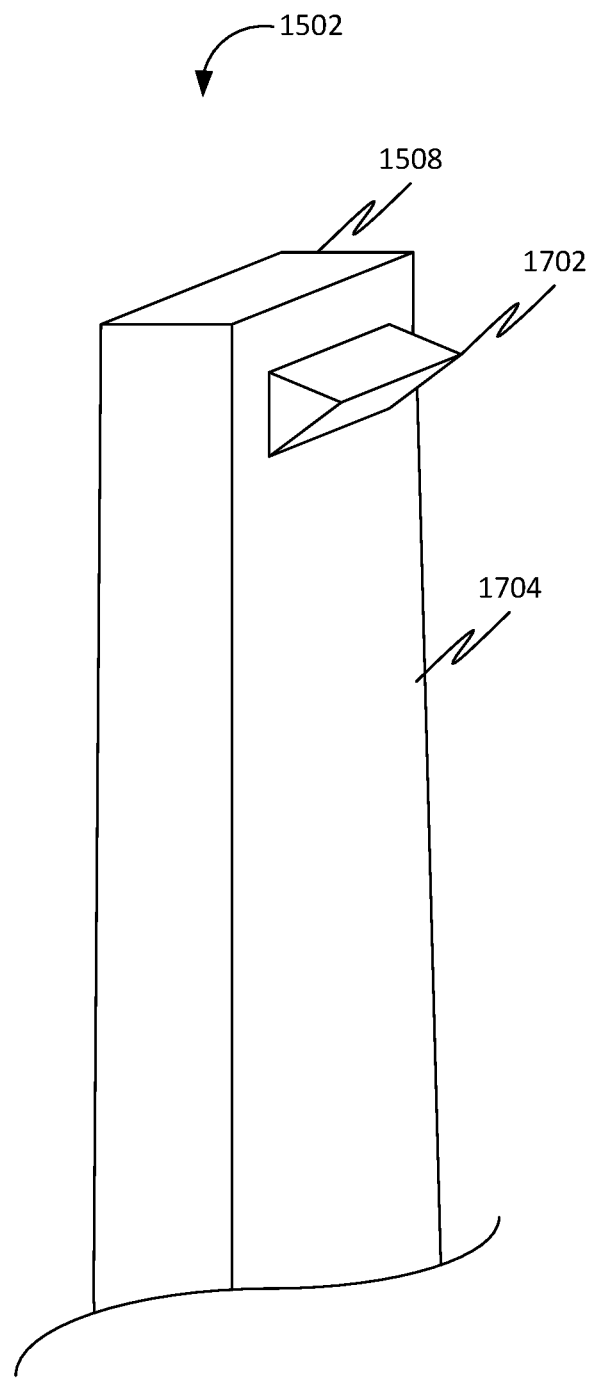
FIG. 22 is a partial perspective view of a leg portion 1502 of the plurality of leg portions 1502-1504, in accordance with some embodiments.

FIG. 22 is a partial perspective view of a leg portion 1502 of the plurality of leg portions 1502-1504, in accordance with some embodiments.

Figure 23:
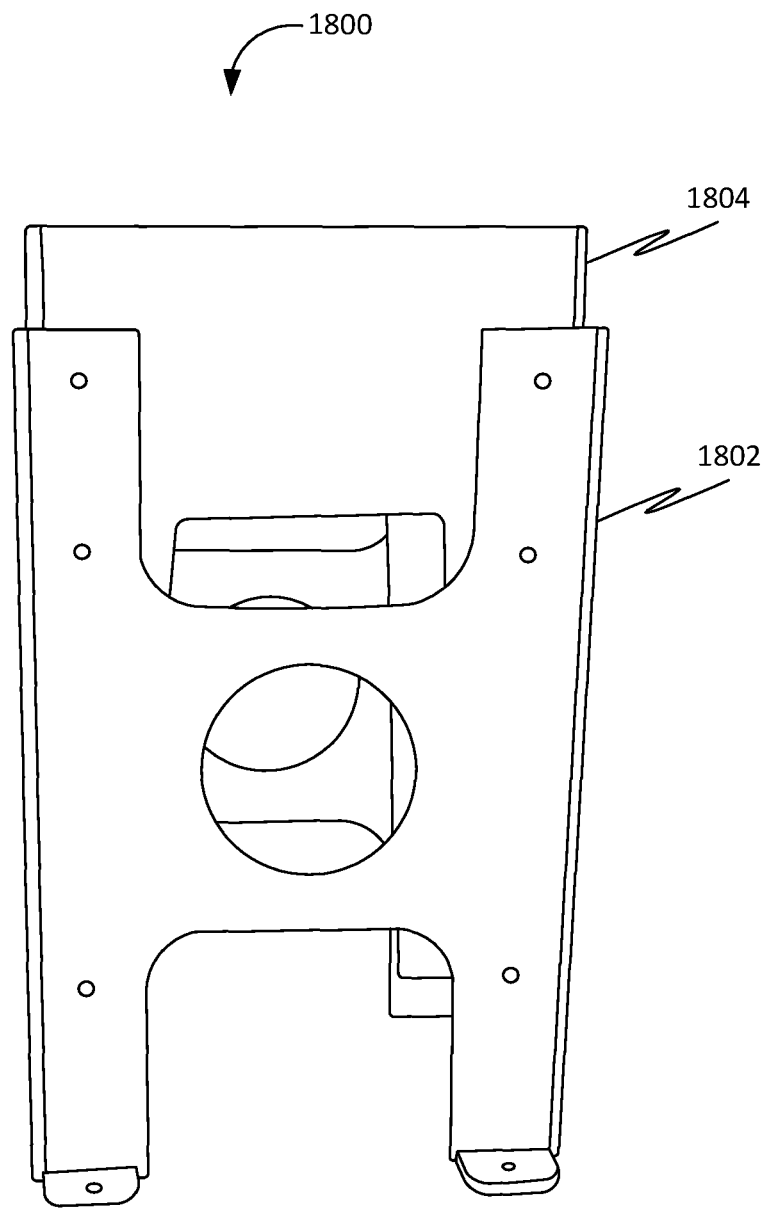
FIG. 23 is a front view of an apparatus 1800 for facilitating installing electrical boxes in a structure, in accordance with some embodiments.

FIG. 23 is a front view of an apparatus 1800 for facilitating installing electrical boxes in a structure, in accordance with some embodiments. Further, the structure may be constructed by pouring construction material against surfaces of construction forms used for constructing the structure. Further, the apparatus 1800 may include a stand 1802 and an extendable member 1804.

Further, the stand 1802 may be configured to be secured in at least one location on at least one surface of at least one construction form used for constructing the structure. Further, the stand 1802 extends between a first end 1806 and a second end 1808. Further, the stand 1802 defines an interior space 1810. Further, the first end 1806 of the stand 1802 may be shaped to define an opening 1812 leading into the interior space 1810. Further, the second end 1808 of the stand 1802 may be configured to be attached to the at least one surface in the at least one location for securing the stand 1802 to the at least one surface.

Further, the extendable member 1804 may be movably disposed in the interior space 1810. Further, the extendable member 1804 extends between a first end 1814 and a second end 1816. Further, the extendable member 1804 may include a platform comprised in the first end 1814 of the extendable member 1804. Further, the platform may include a base wall and at least one side wall. Further, a first end of the at least one side wall may be peripherally attached to the base wall and extends vertically from the base wall forming an electrical box having a box interior space. Further, a second end of the at least one side wall may be shaped to define a box opening leading into the box interior space. Further, the extendable member 1804 may be retractably extendable from the opening 1812 for retractably extending the platform from a first position to at least one second position in relation to the opening 1812 for adjusting a depth of the extendable member 1804. Further, the securing of the stand 1802 in the at least one location on the at least one surface and the adjusting of the depth of the extendable member 1804 locates the platform in at least one platform location in the structure and maintains the at least one platform location of the platform during the pouring of the construction material against the at least one surface of the at least one construction form and curing of the construction material.

Further, in some embodiments, the platform may include a lid. Further, the lid may be configured to be detachably attached to the second end of the at least one side wall for openably closing the box opening. Further, the lid attached to the second end of the at least one side wall closes the box opening to prevent the construction material from entering the box interior space during the pouring of the construction material and the curing of the construction material.

Further, in an embodiment, the platform may include at least one mount. Further, the at least one mount may be disposed in the box interior space and attached to at least one inner wall surface of the at least one side wall. Further, the at least one mount may include at least one mounting hole. Further, the lid may include at least one mounting element. Further, the at least one mounting element disengably engages with the at least one mounting hole for detachably attaching the lid to the second end of the at least one side wall.

Figure 24:
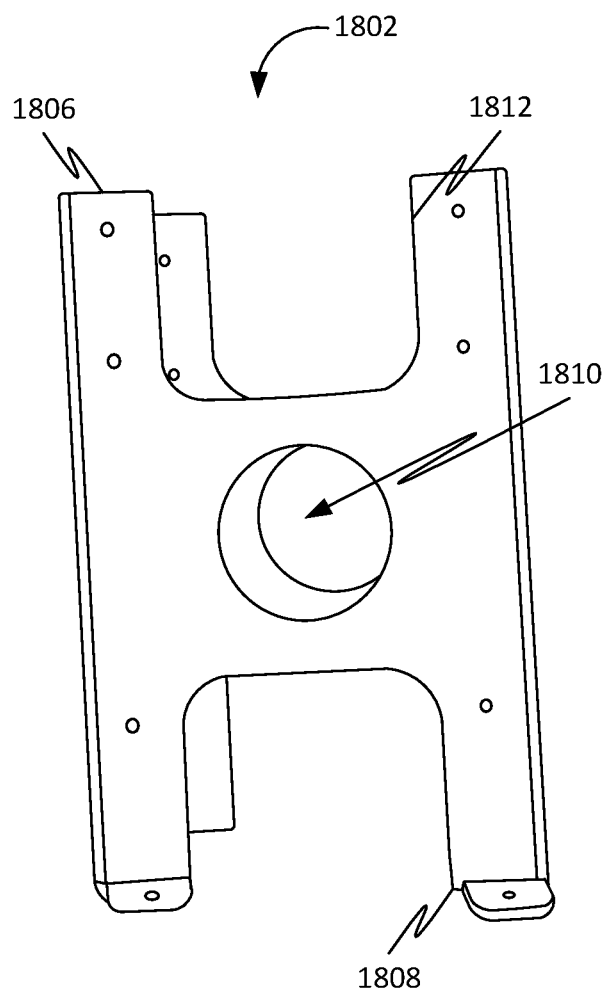
FIG. 24 is a front view of the stand 1802 of the apparatus 1800, in accordance with some embodiments.

FIG. 24 is a front view of the stand 1802 of the apparatus 1800, in accordance with some embodiments.

Figure 25:
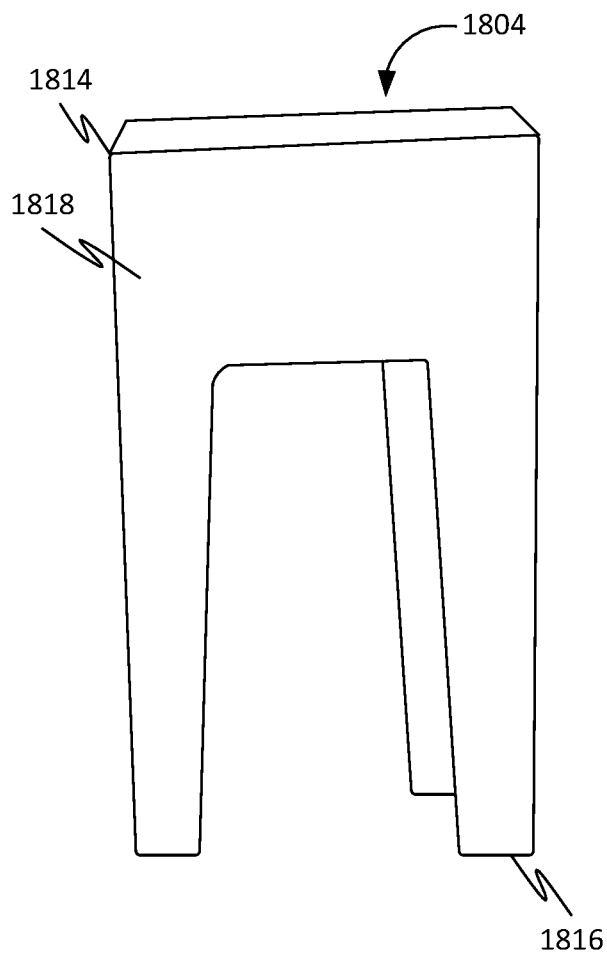
FIG. 25 is a front view of the extendable member 1804 of the apparatus 1800, in accordance with some embodiments.

FIG. 25 is a front view of the extendable member 1804 of the apparatus 1800, in accordance with some embodiments.

Figure 26:
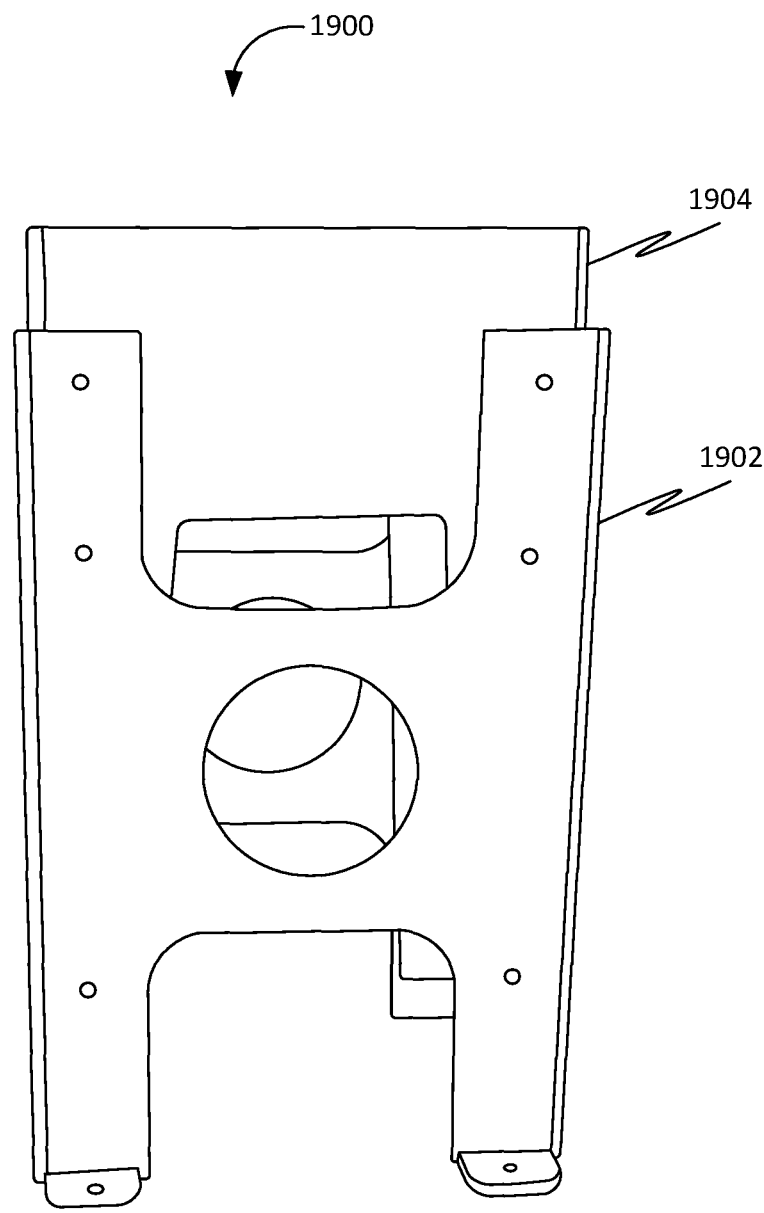
FIG. 26 is a front view of an apparatus 1900 for facilitating installing electrical boxes in a structure, in accordance with some embodiments.

FIG. 26 is a front view of an apparatus 1900 for facilitating installing electrical boxes in a structure, in accordance with some embodiments. Further, the structure may be constructed by pouring construction material against surfaces of construction forms used for constructing the structure. Further, the apparatus 1900 may include a stand 1902 and an extendable member 1904. Further, the stand 1902 may be configured to be secured in at least one location on at least one surface of at least one construction form used for constructing the structure. Further, the stand 1902 extends between a first end 1906 and a second end 1908. Further, the stand 1902 defines an interior space 1910. Further, the first end 1906 of the stand 1902 may be shaped to define an opening 1912 leading into the interior space 1910. Further, the stand 1902 may include a plurality of stand leg portions extending between a first leg portion end and a second leg portion end. Further, the plurality of stand leg portions may be spaced apart and interconnected using a plurality of interconnecting stand portions of the stand 1902. Further, the plurality of stand leg portions and the plurality of interconnecting portions defines the interior space 1910. Further, the interior space 1910 extends from the first leg portion end of the plurality of stand leg portions to the second leg portion end of the plurality of stand leg portions. Further, the first leg portion end of the plurality of stand leg portions defines the opening 1912. Further, the second end 1908 of the stand 1902 may be configured to be attached to the at least one surface in the at least one location for securing the stand 1902 to the at least one surface. Further, the extendable member 1904 may be movably disposed in the interior space 1910. Further, the extendable member 1904 extends between a first end 1914 and a second end 1916. Further, the extendable member 1904 may include a platform comprised in the first end 1914 of the extendable member 1904. Further, the extendable member 1904 may include a plurality of leg portions extending between a first leg portion end and a second leg portion end. Further, the platform may be attached to the first leg portion end of the plurality of leg portions. Further, the extendable member 1904 may be retractably extendable from the opening 1912 for retractably extending the platform from a first position to at least one second position in relation to the opening 1912 for adjusting a depth of the extendable member 1904. Further, at least one of the plurality of stand leg portions may include a plurality of first protrusions disposed on an inner stand leg surface of at least one of the plurality of stand leg portions. Further, the plurality of first protrusions consecutively extends from the first leg portion end and the second leg portion end of at least one of the plurality of stand leg portions defining a plurality of grooves. Further, each of the plurality of grooves may be disposed between each of two first protrusions of the plurality of first protrusions. Further, at least one of the plurality of leg portions may include a second protrusion disposed on an outer leg surface proximal to the second leg portion end of at least one of the plurality of leg portions. Further, the second protrusion disengably engages with at least one of the plurality of grooves based on the disposing of the extendable member 1904 in the interior space 1910. Further, the plurality of grooves may include a first groove corresponding to the first position and at least one second groove corresponding to the at least one second position. Further, the retractably extending of the extendable member 1904 from the first position to the at least one second position in relation to the opening 1912 may include disengaging the second protrusion from the first groove and engaging the second protrusion to the at least one second groove. Further, the disengaging of the second protrusion from the first groove requires at least one external action on the extendable member 1904 in relation to the stand 1902. Further, the engaging of the second protrusion to the at least one second groove fixes the extendable member 1904 to the stand 1902 in the at least one second position. Further, the securing of the stand 1902 in the at least one location on the at least one surface and the adjusting of the depth of the extendable member 1904 locates the platform in at least one platform location in the structure and maintains the at least one platform location of the platform during the pouring of the construction material against the at least one surface of the at least one construction form and curing of the construction material.

Figure 27:
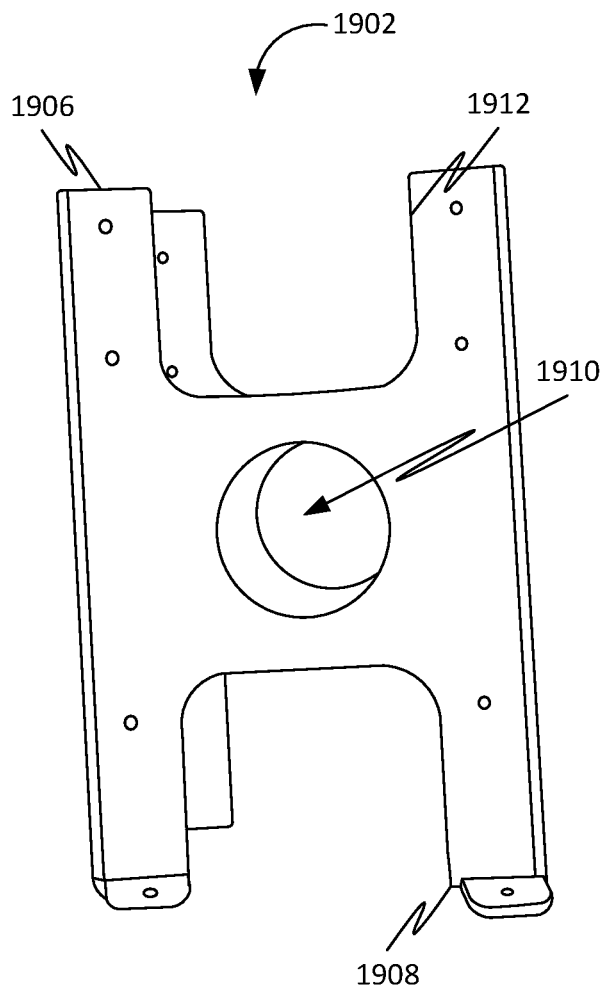
FIG. 27 is a front view of the stand 1902 of the apparatus 1900, in accordance with some embodiments.

FIG. 27 is a front view of the stand 1902 of the apparatus 1900, in accordance with some embodiments.

Figure 28:
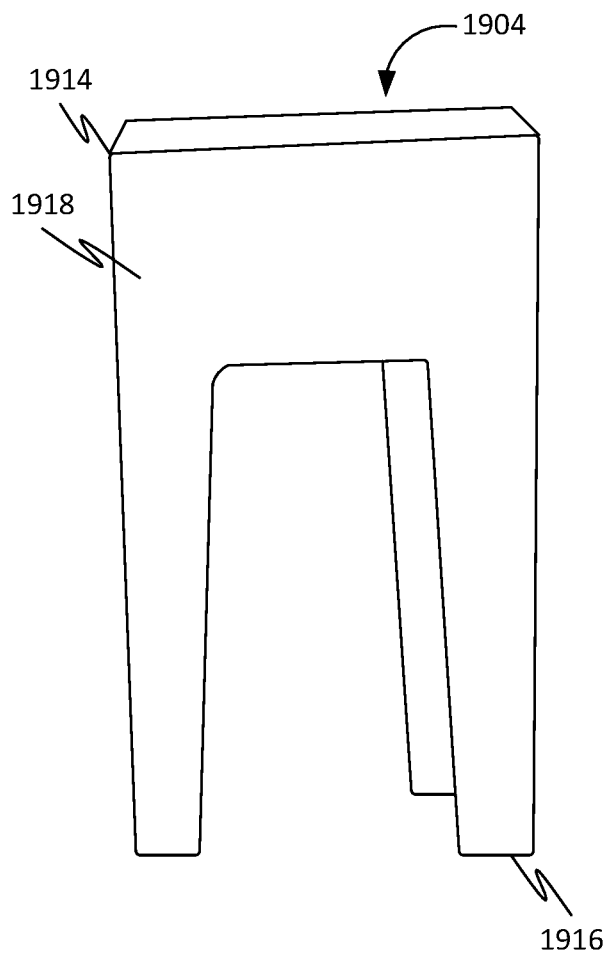
FIG. 28 is a front view of the extendable member 1904 of the apparatus 1900, in accordance with some embodiments.

FIG. 28 is a front view of the extendable member 1904 of the apparatus 1900, in accordance with some embodiments.

Although the present disclosure has been explained in relation to its preferred embodiment, it is to be understood that many other possible modifications and variations can be made without departing from the spirit and scope of the disclosure.

What is claimed is:

1. An apparatus for facilitating installing electrical boxes in a structure, wherein the structure is constructed of construction material poured against surfaces of construction forms, wherein the apparatus comprises:
 a stand configured to be secured in at least one location on at least one surface of at least one construction form used for constructing the structure, wherein the stand extends between a first end and a second end, wherein the stand defines an interior space, wherein the first end of the stand is shaped to define an opening leading into the interior space, wherein the second end of the stand is configured to be attached to the at least one surface in the at least one location; and
 an extendable member movably disposed in the interior space, wherein the extendable member extends between a first end and a second end, wherein the extendable member comprises a platform comprised in the first end of the extendable member, wherein the platform comprises a base wall and at least one side wall, wherein a first end of the at least one side wall is peripherally attached to the base wall and extends vertically from the base wall forming an electrical box having a box interior space, wherein a second end of the at least one side wall is shaped to define a box opening leading into the box interior space, wherein the extendable member is retractably extendable from the opening for retractably extending the platform from a first position to at least one second position in relation to the opening, wherein a depth of the extendable member is adjustable based on the retractably extending of the platform from the first position to the at least one second position, wherein the stand secured in the at least one location on the at least one surface locates the platform in at least one platform location in the structure and is configured to maintain the at least one platform location of the platform while the construction material is being poured against the at least one surface of the at least one construction form and while the construction material is being cured.

2. The apparatus of claim 1 further comprising at least one electrical box configured to be attached to the platform using at least one attaching element, wherein the platform located in the at least one platform location locates the at least one electrical box in at least one box location in the structure, wherein the stand secured in the at least one location maintains the at least one box location of the at least one box.

3. The apparatus of claim 1, wherein the platform comprises a lid, wherein the lid is configured to be detachably attached to the second end of the at least one side wall for openably closing the box opening, wherein the lid attached to the second end of the at least one side wall closes the box opening.

4. The apparatus of claim 3, wherein the platform comprises at least one mount, wherein the at least one mount is disposed in the box interior space and attached to at least one inner wall surface of the at least one side wall, wherein the at least one mount comprises at least one mounting hole, wherein the lid comprises at least one mounting element, wherein the at least one mounting element is configured to be disengageably engaged with the at least one mounting hole to detachably attach the lid to the second end of the at least one side wall.

5. The apparatus of claim 4, wherein the at least one mount comprises at least one additional mounting hole for mounting at least one device to the electrical box.

6. The apparatus of claim 1, wherein the at least one side wall comprises at least one conduit opening, wherein the at least one conduit opening allows connecting at least one electrical conduit to the electrical box.

7. The apparatus of claim 1, wherein the stand comprises at least one body opening leading into the interior space, wherein the at least one body opening allows the construction material to enter into the interior space.

8. The apparatus of claim 1, wherein the extendable member is removably disposed in the interior space of the stand.

9. The apparatus of claim 1, wherein the at least one second position corresponds to at least one amount of the depth of the platform, wherein the extendable member is configured to be resistively moved from the first position and fixed to the stand in the at least one second position.

10. The apparatus of claim 9, wherein the extendable member is configured to be detachably attached to the stand in the at least one second position using at least one attachment element for fixing the extendable member to the stand in the at least one second position.

11. The apparatus of claim 1, wherein the stand comprises a plurality of stand leg portions extending between a first leg portion end and a second leg portion end, wherein the plurality of stand leg portions are spaced apart and interconnected using a plurality of interconnecting stand portions of the stand, wherein the plurality of stand leg portions and the plurality of interconnecting portions defines the interior space, wherein the interior space extends from the first leg portion end of the plurality of stand leg portions to the second leg portion end of the plurality of stand leg portions, wherein the first leg portion end of the plurality of stand leg portions defines the opening.

12. The apparatus of claim 11, wherein the extendable member comprises a plurality of leg portions extending between a first leg portion end and a second leg portion end, wherein the platform is attached to the first leg portion end of the plurality of leg portions.

13. The apparatus of claim 12, wherein at least one of the plurality of stand leg portions comprises a plurality of first protrusions disposed on an inner stand leg surface of at least one of the plurality of stand leg portions, wherein the plurality of first protrusions consecutively extends from the first leg portion end and the second leg portion end of at least one of the plurality of stand leg portions defining a plurality of grooves, wherein each of the plurality of grooves is disposed between each of two first protrusions of the plurality of first protrusions, wherein at least one of the plurality of leg portions comprises a second protrusion disposed on an outer leg surface proximal to the second leg portion end of at least one of the plurality of leg portions, wherein the second protrusion is configured to be disengageably engaged with at least one of the plurality of grooves.

14. The apparatus of claim 13, wherein the plurality of grooves comprises a first groove corresponding to the first position and at least one second groove corresponding to the at least one second position, wherein the extendable member retractably extends from the first position to the at least one second position in relation to the opening based on a disengagement of the second protrusion from the first groove and an engagement of the second protrusion to the at least one second groove.

15. The apparatus of claim 14, wherein the disengagement of the second protrusion from the first groove requires at least one external action on the extendable member in relation to the stand, wherein the engagement of the second protrusion to the at least one second groove fixes the extendable member to the stand in the at least one second position.

16. An apparatus for facilitating installing electrical boxes in a structure, wherein the structure is constructed of construction material poured against surfaces of construction forms, wherein the apparatus comprises:
a stand configured to be secured in at least one location on at least one surface of at least one construction form used for constructing the structure, wherein the stand extends between a first end and a second end, wherein the stand defines an interior space, wherein the first end of the stand is shaped to define an opening leading into the interior space, wherein the second end of the stand is configured to be attached to the at least one surface in the at least one location; and
an extendable member movably disposed in the interior space, wherein the extendable member extends between a first end and a second end, wherein the extendable member comprises a platform comprised in the first end of the extendable member, wherein the platform comprises a base wall and at least one side wall, wherein a first end of the at least one side wall is peripherally attached to the base wall and extends vertically from the base wall forming an electrical box having a box interior space, wherein the at least one side wall comprises at least one conduit opening, wherein the at least one conduit opening allows connecting at least one electrical conduit to the electrical box, wherein a second end of the at least one side wall is shaped to define a box opening leading into the box interior space, wherein the extendable member is retractably extendable from the opening for retractably extending the platform from a first position to at least one second position in relation to the opening, wherein a depth of the extendable member is adjustable based on the retractably extending of the platform from the first position to the at least one second position, wherein the stand secured in the at least one location on the at least one surface locates the platform in at least one platform location in the structure and is configured to maintain the at least one platform location of the platform while the construction material is being poured against the at least one surface of the at least one construction form and while the construction material is being cured.

17. The apparatus of claim 16, wherein the platform comprises a lid, wherein the lid is configured to be detachably attached to the second end of the at least one side wall for openably closing the box opening, wherein the lid attached to the second end of the at least one side wall closes the box opening.

18. The apparatus of claim 17, wherein the platform comprises at least one mount, wherein the at least one mount is disposed in the box interior space and attached to at least one inner wall surface of the at least one side wall, wherein the at least one mount comprises at least one mounting hole, wherein the lid comprises at least one mounting element, wherein the at least one mounting element is configured to be disengageably engaged with the at least one mounting hole to detachably attach the lid to the second end of the at least one side wall.

19. An apparatus for facilitating installing electrical boxes in a structure, wherein the structure is constructed of construction material poured against surfaces of construction forms, wherein the apparatus comprises:
a stand configured to be secured in at least one location on at least one surface of at least one construction form used for constructing the structure, wherein the stand extends between a first end and a second end, wherein the stand defines an interior space, wherein the first end of the stand is shaped to define an opening leading into the interior space, wherein the stand comprises a plurality of stand leg portions extending between a first leg portion end and a second leg portion end, wherein the plurality of stand leg portions are spaced apart and interconnected using a plurality of interconnecting stand portions of the stand, wherein the plurality of stand leg portions and the plurality of interconnecting portions defines the interior space, wherein the interior space extends from the first leg portion end of the plurality of stand leg portions to the second leg portion end of the plurality of stand leg portions, wherein the first leg portion end of the plurality of stand leg portions defines the opening, wherein the second end of the stand is configured to be attached to the at least one surface in the at least one location; and
an extendable member movably disposed in the interior space, wherein the extendable member extends between a first end and a second end, wherein the extendable member comprises a platform comprised in the first end of the extendable member, wherein the extendable member comprises a plurality of leg portions extending between a first leg portion end and a second leg portion end, wherein the platform is attached to the first leg portion end of the plurality of leg portions, wherein the extendable member is retractably extendable from the opening for retractably extending the platform from a first position to at least one second position in relation to the opening, wherein a depth of the extendable member is adjustable based on the retractably extending of the platform from the first position to the at least one second position, wherein at least one of the plurality of stand leg portions comprises a plurality of first protrusions disposed on an inner stand leg surface of at least one of the plurality of stand leg portions, wherein the plurality of first protrusions consecutively extends from the first leg portion end and the second leg portion end of at least one of the plurality of stand leg portions defining a plurality of grooves, wherein each of the plurality of grooves is disposed between each of two first protrusions of the plurality of first protrusions, wherein at least one of the plurality of leg portions comprises a second protrusion disposed on an outer leg surface proximal to the second leg portion end of at least one of the plurality of leg portions, wherein the second protrusion is configured to be disengageably engaged with at least one of the plurality of grooves, wherein the plurality of grooves comprises a first groove corresponding to the first position and at least one second groove corresponding to the at least one second position, wherein the extendable member retractably extends from the first position to the at least one second position in relation to the opening based on a disengagement of the second protrusion from the first groove and an engagement of the second protrusion to the at least one second groove, wherein the disengagement of the second protrusion from the first groove requires at least one external action on the extendable member in relation to the stand, wherein the engagement of the second protrusion to the at least one second groove fixes the extendable member to the stand in the at least one second position, wherein the stand secured in the at least one location on the at least one surface locates the platform in at least one platform location in the structure and is configured to maintain the at least one platform location of the platform while the construction material is being poured against the at least one surface of the at least one construction form and while the construction material is being cured.

* * * * *